(12) United States Patent
Hirata et al.

(10) Patent No.: US 8,351,306 B2
(45) Date of Patent: Jan. 8, 2013

(54) NEAR FIELD OPTICAL HEAD AND INFORMATION RECORDING AND REPRODUCING DEVICE

(75) Inventors: Masakazu Hirata, Chiba (JP); Manabu Oumi, Chiba (JP); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 333 days.

(21) Appl. No.: 12/733,983

(22) PCT Filed: Sep. 25, 2008

(86) PCT No.: PCT/JP2008/067347
§ 371 (c)(1),
(2), (4) Date: Jul. 12, 2010

(87) PCT Pub. No.: WO2009/044663
PCT Pub. Date: Apr. 9, 2009

(65) Prior Publication Data
US 2010/0284252 A1    Nov. 11, 2010

(30) Foreign Application Priority Data
Oct. 3, 2007 (JP) ................................ 2007-259796

(51) Int. Cl.
*G11B 11/00* (2006.01)
(52) U.S. Cl. .................. 369/13.33; 369/13.13
(58) Field of Classification Search ............... 369/13.33, 369/13.13, 13.32, 13.02, 112.09, 112.14, 369/112.21, 112.27, 300; 360/59; 385/129, 385/31, 88–94; 29/603.01–603.27; 250/201.3, 250/201.5
See application file for complete search history.

(56) References Cited

U.S. PATENT DOCUMENTS

| | | | |
|---|---|---|---|
| 2002/0167870 A1* | 11/2002 | Akiyama et al. | 369/13.33 |
| 2005/0078565 A1* | 4/2005 | Peng et al. | 369/13.32 |
| 2006/0103982 A1* | 5/2006 | Nakamoto et al. | 360/126 |
| 2007/0139818 A1* | 6/2007 | Shimazawa et al. | 360/126 |
| 2012/0113769 A1* | 5/2012 | Hirata et al. | 369/13.32 |

FOREIGN PATENT DOCUMENTS

| | | | |
|---|---|---|---|
| JP | 2002298302 A | * | 10/2002 |
| JP | 2003006803 A | * | 1/2003 |
| JP | 2005116155 A | * | 4/2005 |
| JP | 2006139873 A | * | 6/2006 |
| JP | 2007164935 A | * | 6/2007 |

* cited by examiner

*Primary Examiner* — Tan X Dinh
(74) *Attorney, Agent, or Firm* — Adams & Wilks

(57) ABSTRACT

A near field optical head includes a slider 20, a main magnetic pole 32 and an auxiliary magnetic pole 30 and is provided with a recording element 21 fixed on a top end surface of the slider. The near field optical head is provided with a light flux transmission element 22. The light flux transmission element 22 is fixed adjacently to the main magnetic pole and formed from a flat surface 40*a* and a curved surface 40*b* into the shape of a half column. The light flux transmission element 22 includes a core 40 for transmitting a light flux L introduced from one end to the other end and a cladding 41 for confining therein the core. The near field optical head includes a metal film 23, which is formed on a curved surface in the vicinity of the other end of the core for generating near filed light R from a light flux to localize the near field light on a field surface between the metal film and the curved surface, and a light flux introducing means 4 for introducing the light flux having a polarization direction adjusted into a straight direction substantially perpendicular to the flat surface from one end into the core. A top end of the main magnetic pole 32 is bent toward the core and embedded in the core while being exposed to the other end.

8 Claims, 17 Drawing Sheets

NEAR FIELD OPTICAL HEAD AND INFORMATION RECORDING AND REPRODUCING DEVICE

CROSS-REFERENCE TO RELATED APPLICATIONS

This application is a U.S. national stage application of International Application No. PCT/JP2008/067347 filed Sep. 25, 2008, claiming a priority date of Oct. 3, 2007, and published in a non-English language.

TECHNICAL FIELD

The present invention relates to a near field optical head using near field light to record various kinds of information in a magnetic recording medium and an information recording and reproducing device including the near field optical head.

BACKGROUND ART

Density in recording information in a single recording surface has increased recently in accordance with an increase in capacity of a hard disc and such in a computer apparatus. Surface record density should be increased in order to increase recording capacity per an area of a magnetic disc, for example. A recording area per a bit in a recording medium, however, decreases according to an increase in record density. A decrease in size of a bit causes energy included in information of a bit to get closer to heat energy in a room temperature. Accordingly, there is a problem of heat demagnetization such as reversal and disappearance of recorded information due to thermal fluctuation and the like.

An in-plane recording system, which has been generally used, is a system of recording magnetism so that a direction of magnetization would be faced to an in-plane direction of a recording medium. In this system, however, easily occurs the above-mentioned disappearance of recorded information and such due to heat demagnetization. Accordingly, the system is changing to a perpendicular recording system in which a signal of magnetization is recorded in a direction perpendicular to a recording medium for the purpose of solving such a disadvantage. The perpendicular recording system is a system in which magnetic information is recorded in a recording medium according to the principle that a single magnetic pole is brought close. The recording magnetic field is faced to a direction substantially perpendicular to a recording film in accordance with the perpendicular recording system. Information recorded in a perpendicular magnetic field is easy to keep stability in energy since it is difficult for the pole N and the pole S to form a loop in a surface of the recording film. Accordingly, the perpendicular recording system has a more tolerance to heat demagnetization than the in-plane recording system.

Recent recording media, however, are required to have further higher density according to the need for recording and reproducing a greater quantity of information having higher density. In order to meet the requirement, introducing has been a recording medium having a great coercivity for the purpose of keeping influence of adjacent magnetic sections and thermal fluctuation to a minimum. This makes record of information in a recording medium difficult even in the case of the above-mentioned perpendicular recording system.

In order to solve such a disadvantage, proposed has been a hybrid magnetic recording system in which spot light formed by converging light or near field light is used to locally heat a magnetic section and temporarily reduce the coercivity while writing is carried out. Especially in the case of using the near field light, it is enabled to handle optical information in a region lower than a wavelength of light, the wavelength being a limit in a conventional optical system. Accordingly, the density of a recording bit can be made higher than that of a conventional optical information recording and reproducing device.

Various kinds of recording head having the above-mentioned hybrid magnetic recording system have been proposed. Among them, known has been a thin film magnetic head in which near field light is used for heating (JP-A-2007-164935 and JP-A-2007-164936).

The thin film magnetic head comprises a writing element chiefly having a main magnetic pole layer and an auxiliary magnetic pole layer and a near field light generation layer for generating near field light. The writing element and the near field light generation layer are covered with a coating layer and fitted on a side surface (an element forming surface) of a slider fixed to a top end of a load beam in order. Top ends of the main magnetic pole layer, the auxiliary magnetic pole layer and the near filed light generation layer are exposed from the coating layer and arranged to face the recording medium.

The main magnetic pole layer is connected to the auxiliary magnetic pole layer inside the coating layer. This makes the main magnetic pole layer and the auxiliary magnetic pole layer form a single magnetic pole type perpendicular head in which one magnetic pole (a single magnetic pole) is vertically provided. A coil layer is provided between the main magnetic pole layer and the auxiliary magnetic pole layer so as to be insulated from the both layers. The main magnetic pole layer, the auxiliary magnetic pole layer and the coil layer form an electromagnet as a whole.

The near field light generation layer is a metal layer made of various kinds of metal materials and formed so as to be adjacent to the main magnetic pole layer. It is formed so as to be tapered toward the top end faced to the recording medium. A laser beam incident on the near field light generation layer is arranged to cause the near field light to be generated from the top end. The coating layer is a layer functioning as an optical waveguide for introducing a laser beam emitted from an optical fiber to the near field light generation layer. The coating layer has a multi-layer structure in which layers formed from different materials are laminated.

On the other hand, the slider having the writing element and the near field light generation layer, which are covered with the coating layer, is generally fixed to the top end of a load beam so that its position can be changed. Moreover, an optical fiber for introducing a laser beam to the slider is fixed to the load beam. The optical fiber is fixed so that its top end would not be in contact with the slider. Accordingly, the laser beam emitted from the top end of the optical fiber is incident on the coating layer after transmission in the air and advances in the coating layer to reach the near field light generation layer.

In the case of using a thin film magnetic head having such a structure, the near field light is generated while the recording magnetic field is simultaneously operated so that various kinds of information would be recorded in the recording medium.

That is to say, a laser beam is radiated from the optical fiber to the coating layer. The laser beam advances in the coating layer and reaches the near field light generation layer. The laser beam then causes free electrons in the near field light generation layer to be oscillated evenly, so that a plasmon is excited, and thereby, the near field light is generated at a top end part locally. As a result, the near field light locally heats the magnetic recording layer of a recording medium and the coercivity is temporarily reduced.

Further, supplying a coil layer with a driving electric current at the same time as radiation of a laser beam allows the recording magnetic field to be locally applied to the magnetic recording layer of a recording medium, which is close to a top end of the main magnetic pole layer. As a result, various kinds of information can be recorded in a magnetic recording layer whose coercivity is temporarily reduced. That is to say, cooperation between the near field light and the magnetic field enables record in a recording medium to be achieved.

DISCLOSURE OF THE INVENTION

Problems Solved by the Invention

The above-mentioned conventional thin film magnetic head, however, still has the following problems.

That is to say, incidence of a laser beam on the near field light generation layer causes the near field light essential to record of information to be generated. The near field light generation layer should be formed so as to be tapered with high processing precision in order to make the near filed light local. Higher processing precision, however, causes a trouble, and thereby, a high cost. Furthermore, the processing precision directly influences the near field light, so that it is difficult to generate the near field light stably and evenly in mass production of the thin film magnetic head.

Especially, the conventional thin film magnetic head has been worked out so that apart of the near field light generating layer would be formed obliquely for the purpose of efficient generation of the near field light, for example. It has been difficult, however, to form the near field light generation layer with high precision in practice.

Moreover, in the case of piling the near field light generation layer on the main magnetic pole layer, the near filed light is locally located at a position away from the main magnetic pole layer by the thickness of the near field light generation layer. Accordingly, a position of a near field light spot on which the near field light operates is away from a position of a magnetic field spot on which the recording magnetic field operates. This makes cooperation between the near field light and the magnetic field insufficient, so that deterioration in reliability in writing is caused.

Furthermore, a position of the slider is properly changed in accordance with undulation and the like of a recording medium. This causes a possibility of a change in incident position (position incident on the coating layer) of a laser beam emitted from an optical fiber. Accordingly, there is a possibility that a part of the laser beam would not reach the near field light generation layer and form leaked light leaked from the coating layer to the outside on the way to the near field light generation layer. This results in waste of a part of the laser beam, so that the near field light may not be generated efficiently. Further, such leaked light may deteriorate a ratio of S/N.

The invention is conceived in view of such a situation. An object of the invention is to provide a near field optical head capable of stably generating near field light having strong intensity in the vicinity of a main magnetic pole with no influence of a change in position of a slider and processing precision and an information recording and reproducing device including the near field optical head.

Means for Solving the Problems

The invention provides the following means for the purpose of solving the problems.

A near field optical head in accordance with the invention is a near field optical head for generating near field light from an introduced light flux to heat a magnetic recording medium rotating in a fixed direction and for causing magnetization reversal by giving a recording magnetic field perpendicular to the magnetic recording medium so as to record information, the near field optical head characterized by comprising: a slider provided so as to face a surface of the magnetic recording medium; a recording element having a main magnetic pole for generating the recording magnetic field and an auxiliary magnetic pole and fixed to a top end surface of a slider so that the both magnetic poles would be in line in a longitudinal direction of the slider with the auxiliary magnetic pole being located on a top end surface side of the slider; a light flux transmission element having a core formed from a flat surface and a curved surface into the shape of a half column for reflecting the light flux introduced from one end side in the core to transmit the light flux to the other end side and a cladding closely adhered to the core for confining therein the core with the other end side of the core being exposed at least to the outside, the light flux transmission element being fixed adjacently to the main magnetic pole so that the other end side would be faced to the magnetic recording medium while the flat surface would be faced to the main magnetic pole; a metal film formed on the curved surface of the core at least in the vicinity of the other end side for generating near field light from the light flux having been transmitted in the core and localizing the generated near field light on a field surface between the metal film and the curved surface; and a light flux introducing means fixed to the slider so as to be provided parallel to the slider for introducing the light flux having a polarization direction adjusted into a straight direction substantially perpendicular to the flat surface from the one end side into the core, wherein the main magnetic pole has a top end bending toward a core side and is exposed to the other end side while being embedded in the core.

In the near field optical head in accordance with the invention, information can be recorded in a rotating magnetic recording medium by a hybrid magnetic recording method in which the near field light and the recording magnetic field are cooperated.

First, the slider is provided so as to face a surface of the magnetic recording medium. The recording element having the main magnetic pole and the auxiliary magnetic pole is fixed to a top end surface of the slider. In this case, the auxiliary magnetic pole is located on the top end surface of the slider while the main magnetic pole is provided adjacently to the auxiliary magnetic pole. Further, fixed is the light flux transmission element adjacently to the main magnetic pole. That is to say, on the top end surface of the slider, provided are the auxiliary magnetic pole, the main magnetic pole and the light flux transmission element in this order from a slider side. The light flux transmission element is fixed so that the other end would be faced to the magnetic recording medium while the flat surface of the core would be faced to the main magnetic pole. One end of the light flux transmission element provided away from the magnetic recording medium is connected to the light flux introducing means fixed to the slider.

A light flux is introduced from the light flux introducing means into the core of the light flux transmission element in the case of carrying out record. At that time, the light flux is introduced in a direction parallel to the slider. The introduced light flux is then repeatedly reflected in the half-columnar core to be transmitted to the other end located on a magnetic recording medium side. The transmitting light flux does not leak to the outside of the core on the way since the cladding is closely adhered to the core, especially. Accordingly, the introduced light flux can be transmitted to the other end without being wasted. The light flux is incident on the metal film formed on the curved surface of the core after it advanced to the neighborhood of the other end of the core. This causes the surface plasmon to be excited on the metal film. The excited surface plasmon increases due to a resonance effect to be transmitted along the field surface between the core and the metal film to the other end of the core. The excited surface plasmon is leaked to the outside as the near field light having high intensity when it reaches the other end. This allows the near field light to be localized on the field surface between the curved surface of the core and the metal film.

On the other hand, the light flux introducing means introduces into the core the light flux having a polarization direction adjusted into a straight direction substantially perpendicular to the flat surface of the core. Accordingly, the near field light is not generated evenly all over the surface of the curved metal film formed on the curved surface of the core, but generated collectively along a surface crossing at right angles with a direction of straight polarization. This allows the near field light having high intensity to be generated collectively at a part of the field surface instead of localization of the near field light all over the field surface between the curved surface of the core and the metal film. Especially, the near field light having high intensity can be generated collectively in a position extremely close to the main magnetic pole since the top end of the main magnetic pole is embedded in the core to be exposed to the other end.

This causes the magnetic recording medium to be locally heated with the near field light, and thereby, the coercivity to be temporality reduced. The coercivity of the magnetic recording medium can be reduced especially in the vicinity of the main magnetic pole.

On the other hand, the recording element is operated to generate the recording magnetic field between the main magnetic pole and the auxiliary magnetic pole at the same time as the introduction of the light flux. This allows the recording magnetic field to be generated at a localized pinpoint of the magnetic recording medium whose coercivity has been reduced due to the near field light. The recording magnetic field changes its direction in accordance with information to be recorded. The magnetic recording medium changes its direction of magnetization into a perpendicular direction in accordance with a direction of the recording magnetic field when it receives the recording magnetic field. This results in record of information.

That is to say, information can be recorded by the hybrid magnetic recording method in which the near field light and the recording magnetic field are cooperated. Further, the perpendicular magnetic recording method receives little influence of a phenomenon of thermal fluctuation, so that stable record can be achieved with high reliability in writing. Moreover, the coercivity of the magnetic recording medium can be reduced at a location extremely close to the main magnetic pole, so that a peak position of a heating temperature can be set at a location where the recording magnetic field locally operates. This allows record to be surely performed and density of record to be increased.

Especially, the near field light is generated collectively at a part of the field surface between the curved surface of the core and the metal film by introducing the light flux having the adjusted polarization direction into the core formed into the shape of a half column. That is to say, a characteristic of the light is used to generate the near field light collectively. Accordingly, physical design of the respective components such as the light flux transmission element and the metal film has no influence on stable generation of the near filed light having high intensity even in the case of forming the respective components without high processing precision. This allows manufacture to be made comparatively easy and a cost to be prevented from being increased, and furthermore, density of record to be stably increased.

Moreover, using the light flux introducing means fixed to the slider to introduce the light flux into the light flux transmission element allows the light flux to be stably introduced with no influence of fluctuation in position of the slider even in the case of the fluctuation in position, differently from a conventional device. Accordingly, reliability in writing can be improved. Furthermore, the recording element and the light flux transmission element are provided in the top end surface of the slider on the trailing edge end. This causes the respective components other than the light flux introducing means to be prevented from being overlapped in a direction of the thickness of the slider as much as possible. Accordingly, thinning in size can be achieved with compact design. Furthermore, the light flux can be certainly introduced via the light flux introducing means, so that the light source for generating the light flux can be easily provided.

The near field optical head in accordance with the invention is characterized in that the core is formed so as to be tapered from one end to the other end in the near field optical head according to the invention.

In the near field optical head in accordance with the invention, the half-columnar core is formed so as to be tapered from one end to the other end. This causes the light flux to be gradually converged when the light flux is repeatedly reflected to be transmitted to the other end. Accordingly, the further the light flux is transmitted, the more a spot size of the light flux decreases since it is gradually narrowed down. This allows the light flux whose spot size is reduced to be made incident on the metal film, so that the surface plasmon can be efficiently excited. As a result, the near field light can be more efficiently generated and density of record can be increased.

In addition, the near field optical head in accordance with the invention is characterized in that at least a part of a top end of the main magnetic pole embedded in the core is made a curved surface swelling out toward the metal film and the part is close to the metal film in the near field optical head according to the invention.

In the near field optical head in accordance with the invention, a part of the top end of the main magnetic pole is close to the metal film. Accordingly, the near field light localized on the field surface between the curved surface of the core and the metal film can be generated more closely to the main magnetic pole. This allows the near field light and the recording magnetic field to be further efficiently cooperated, so that record with higher density can be achieved.

Moreover, the near field optical head in accordance with the invention is characterized in that the cladding is formed with one end of the core being exposed to an outside in the near field optical head according to the invention.

In the near field optical head in accordance with the invention, the cladding is formed with one end of the core being exposed to the outside. This allows the light flux to be introduced into the core directly with no cladding. Accordingly, a loss can be suppressed as much as possible in introducing the light flux. As a result, the magnetic recording medium can be further efficiently heated.

Furthermore, the near field optical head in accordance with the invention is characterized by comprising a reproducing element for outputting an electric signal corresponding to a size of a magnetic field leaked from the magnetic recording medium in the near field optical head according to the invention.

In the near field optical head in accordance with the invention, the reproducing element outputs an electric signal corresponding to a size of a magnetic field leaked from the magnetic recording medium. Accordingly, the information recorded in the magnetic recording medium can be reproduced on the basis of the electric signal outputted from the reproducing element in addition to record of information.

Further, the near field optical head in accordance with the invention is characterized in that the reproducing element is provided between the slider and the recording element in the near field optical head according to the invention.

In the near field optical head in accordance with the invention, the reproducing element is provided between the slider and the recording element. This means that the reproducing element, the recording element and the light flux transmission element are lined in this order from the top end surface side of the slider. Accordingly, the recording element and the light flux transmission element can be approached to the magnetic recording medium as much as possible even in the case that the slider provided so as to face the surface of the magnetic recording medium is inclined with the tope end surface of the slider being faced to the magnetic recording medium. This allows the near field light and the recording magnetic field to more efficiently operate on the magnetic recording medium, so that record with high density can be achieved.

In addition, the near field optical head in accordance with the invention is characterized in that the reproducing element is provided so as to be embedded in the cladding in the near field optical head in accordance with the invention.

In the near field optical head in accordance with the invention, the reproducing element is embedded in the cladding wherein the core is confined. This allows the thickness of the reproducing element to be absorbed by the cladding. Accordingly, the recording element and the light flux transmission element can be approached to the magnetic recording medium as much as possible even in the case that the slider provided so as to face the surface of the magnetic recording medium is inclined with the top end surface of the slider being faced to the magnetic recording medium. This allows the near field light and the recording magnetic field to more efficiently operate on the magnetic recording medium, so that record with high density can be achieved.

Furthermore, an information recording and reproducing device in accordance with the invention is characterized by comprising: the near field optical head according to the invention; a beam movable in a direction parallel to a surface of the magnetic recording medium for holding on a top end side the near field optical head so as to be freely rotatable about two axes parallel to the surface of the magnetic recording medium, the two axes crossing at right angles with each other; a light source for making the light flux incident on the light flux introducing means; an actuator for holding a base end of the beam and moving the beam to a direction parallel to the surface of the magnetic recording medium; a rotation driving part for rotating the magnetic recording medium in a fixed direction; and a control part for controlling operations of the recording element and the light source.

In the information recording and reproducing device in accordance with the invention, the rotation driving part rotates the magnetic recording medium in a fixed direction, and then, the actuator moves the beam to make a scan of the near field optical head. The near field optical head is then located at a desired position on the magnetic recording medium. At that time, the near field optical head is held on the beam so as to be freely rotatable about two axes parallel to the surface of the magnetic recording medium, the two axes crossing at right angles with each other, namely, so as to be able to twist around the two axes. Accordingly, the twist can absorb a change in wind pressure caused by undulation of the magnetic recording medium or a change in directly transmitted undulation even in the case that the undulation occurs in the magnetic recording medium, so that the position of the near field optical head can be made stable.

The control part then operates the recording element and the light source. This allows the near field optical head to make the near field light and the recording magnetic field cooperate to record information in the magnetic recording medium. Especially, providing the above-mentioned near field optical head allows the reliability in writing to be increased, record with higher density to be achieved and quality to be improved. Simultaneously, it is possible to manufacture the device more compact and thinner.

BEST MODE FOR CARRYING OUT THE INVENTION (First Embodiment)

Now, described will be a first embodiment of the invention, made reference to FIGS. 1 to 11. An information recording and reproducing device 1 in accordance with the embodiment is a device for writing to a disc (a magnetic recording medium) D including a perpendicular recording layer d2 by a perpendicular recording system. In the embodiment, exemplified is an air floating type in which an airflow caused by rotation of the disc D is used to float a near field optical head 2.

Figure 1:
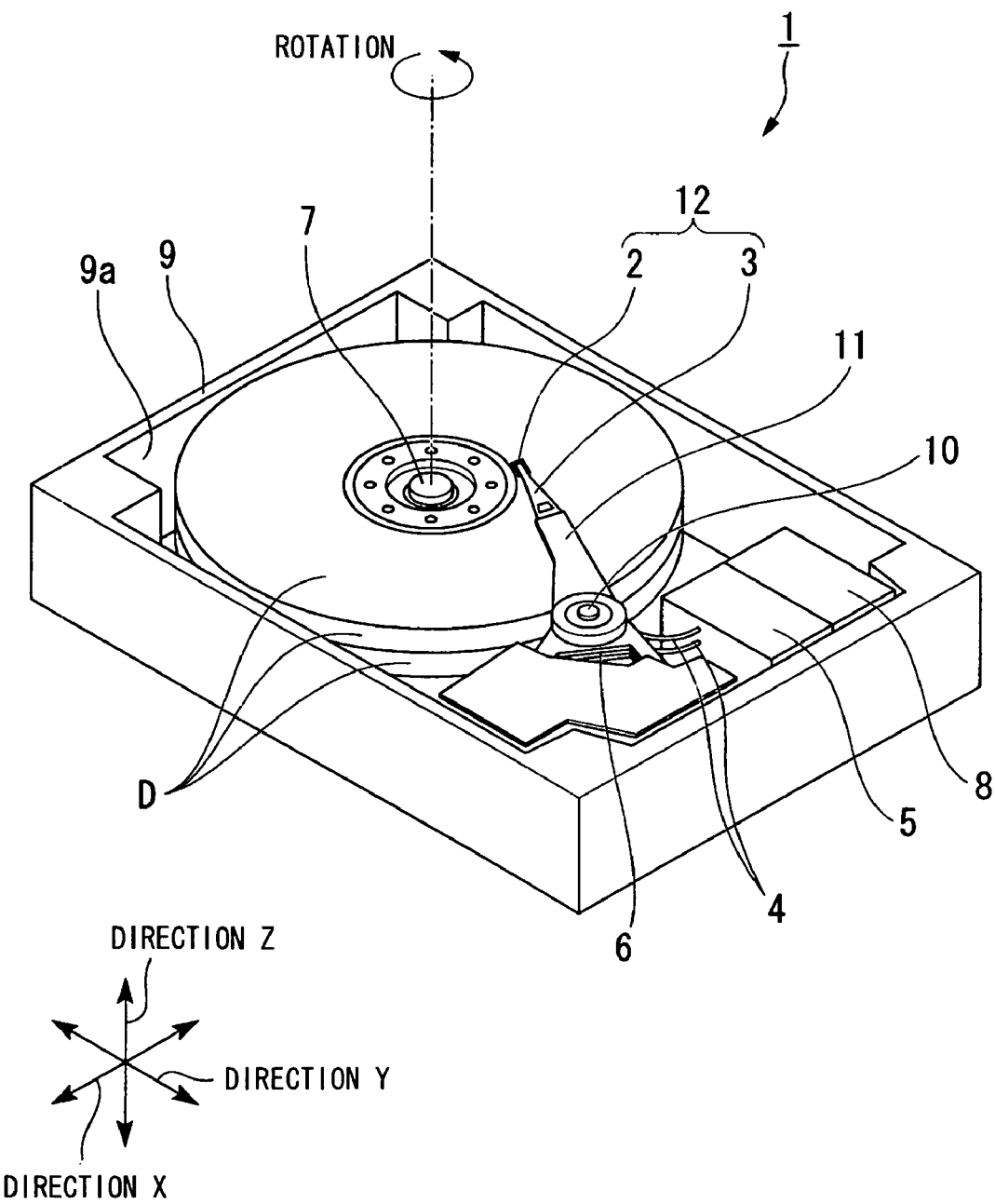
[FIG. 1] It illustrates a structure of an information recording and reproducing device, showing a first embodiment of the invention.

The information recording and reproducing device 1 in accordance with the embodiment comprises a light near field optical head 2, a beam 3 capable of moving in a direction XY parallel to a disc surface (a surface of a magnetic recording medium) D1 for holding on a top end side the near field optical head 2 so as to be freely rotable about two axes (axes X and Y) parallel to the disc surface D1, the two axes crossing at right angles with each other, a light signal controller (a light source) 5 for making a light flux L incident on an optical waveguide (a light flux introducing means) 4 from a base end of the optical waveguide 4, an actuator 6 for holding a base end of the beam 3 and scan-moving the beam 3 toward the direction XY parallel to the disc surface D1, a spindle motor (a rotation driving part) 7 for rotating the disc D in a fixed direction, a control part 8 for supplying a later-mentioned coil 33 with an electric current having been modulated in accordance with information and controlling an operation of the light signal controller 5 and a housing 9 for containing therein the respective components, as shown in FIG. 1.

The housing 9 is formed from a metal material such as aluminum into a quadrilateral shape in a top view. In the housing 9, formed is a concave part 9a for containing the respective components. Further, the housing 9 is provided with a lid not shown, which is detachably fixed, so that the lid would close an opening of the concave part 9a. The spindle motor 7 is mounted to a substantial center of the concave part 9a. Inserting the spindle motor 7 into a center hole allows the disc D to be detachably fixed. To a corner of the concave part 9a, mounted is the actuator 6. A carriage 11 is fixed to the actuator 6 through bearings 10. The beam 3 is mounted to a top end of the carriage 11. A drive of the actuator 6 allows the carriage 11 and the beam 3 to move together in the direction XY.

The carriage 11 and the beam 3 are arranged to withdraw from a surface of the disc D through a drive of the actuator 6 when rotation of the disc D is stopped. The near field optical head 2 and the beam 3 form a suspension 12. The light signal controller 5 is mounted adjacently to the actuator 6 in the concave part 9a. The control part 8 is mounted adjacently to the actuator 6.

The near field optical head 2 uses near field light R to heat the rotating disc D and applies a perpendicular recording magnetic field to the disc D to cause magnetization reversal, and thereby, to record information.

Figure 2:
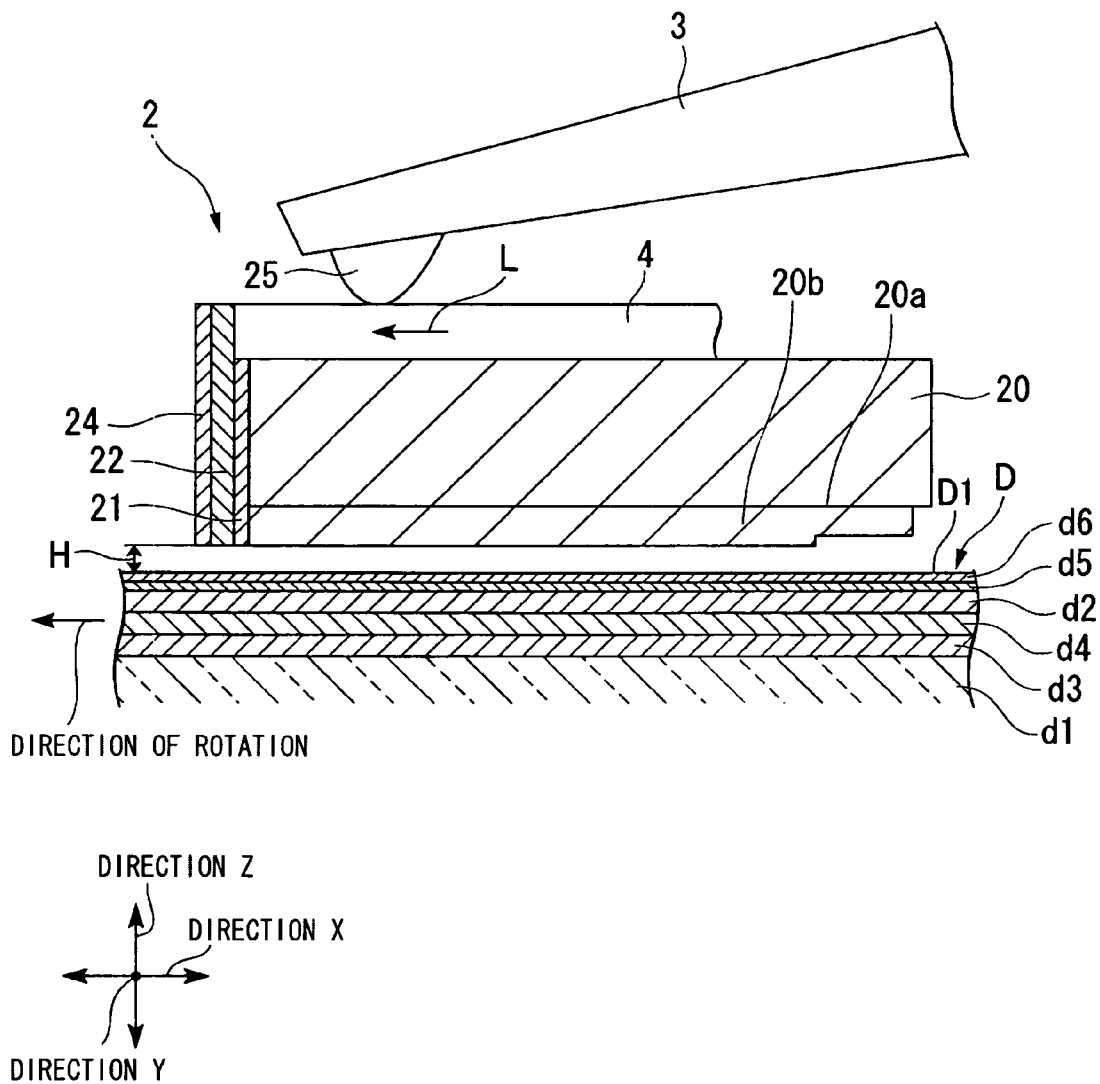
[FIG. 2] It is an enlarged sectional view of a near field optical head shown in FIG. 1.
Figure 3:
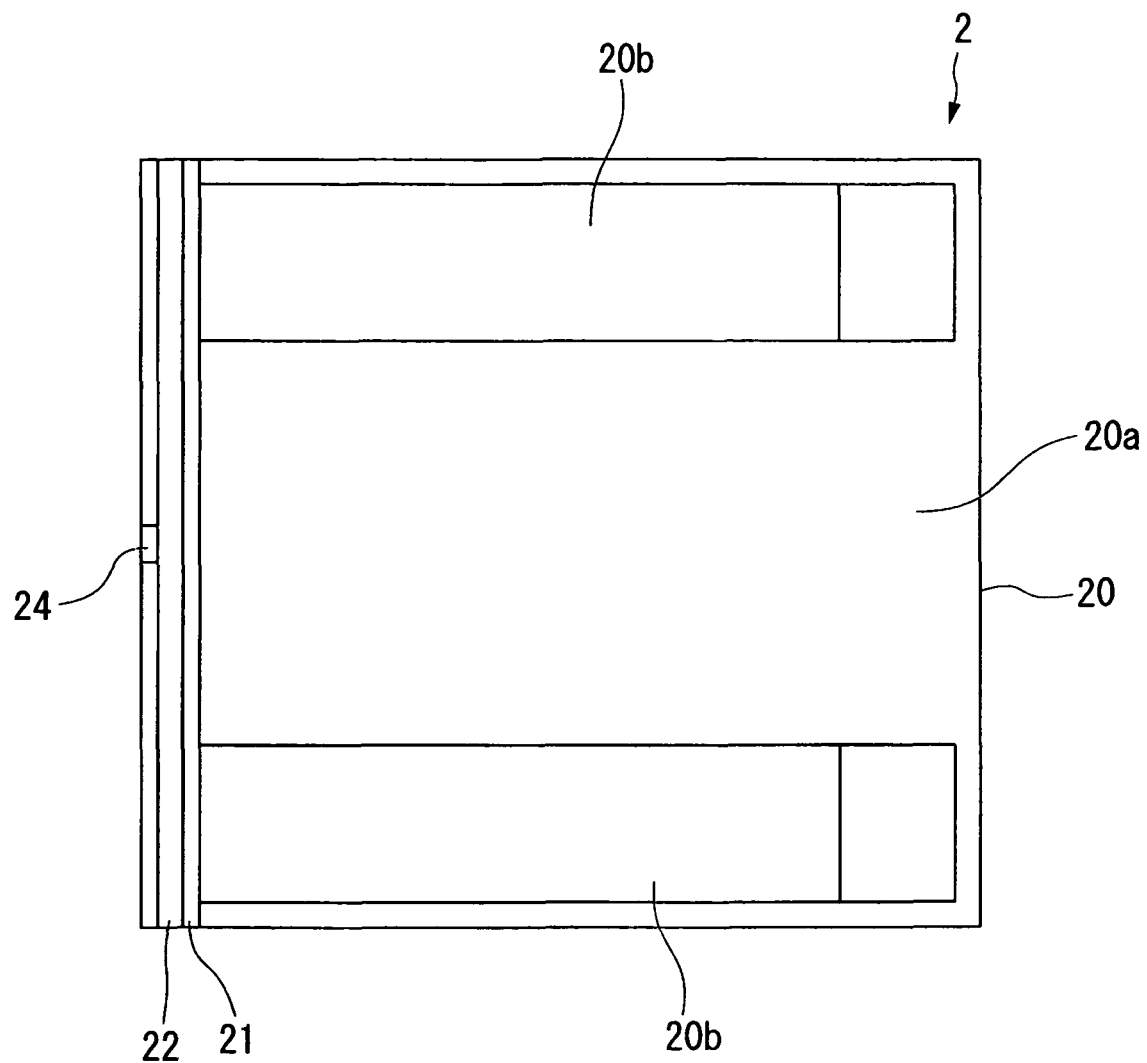
[FIG. 3] It illustrates the near field optical head shown in FIG. 2 in a view from a disc surface side.
Figure 4:
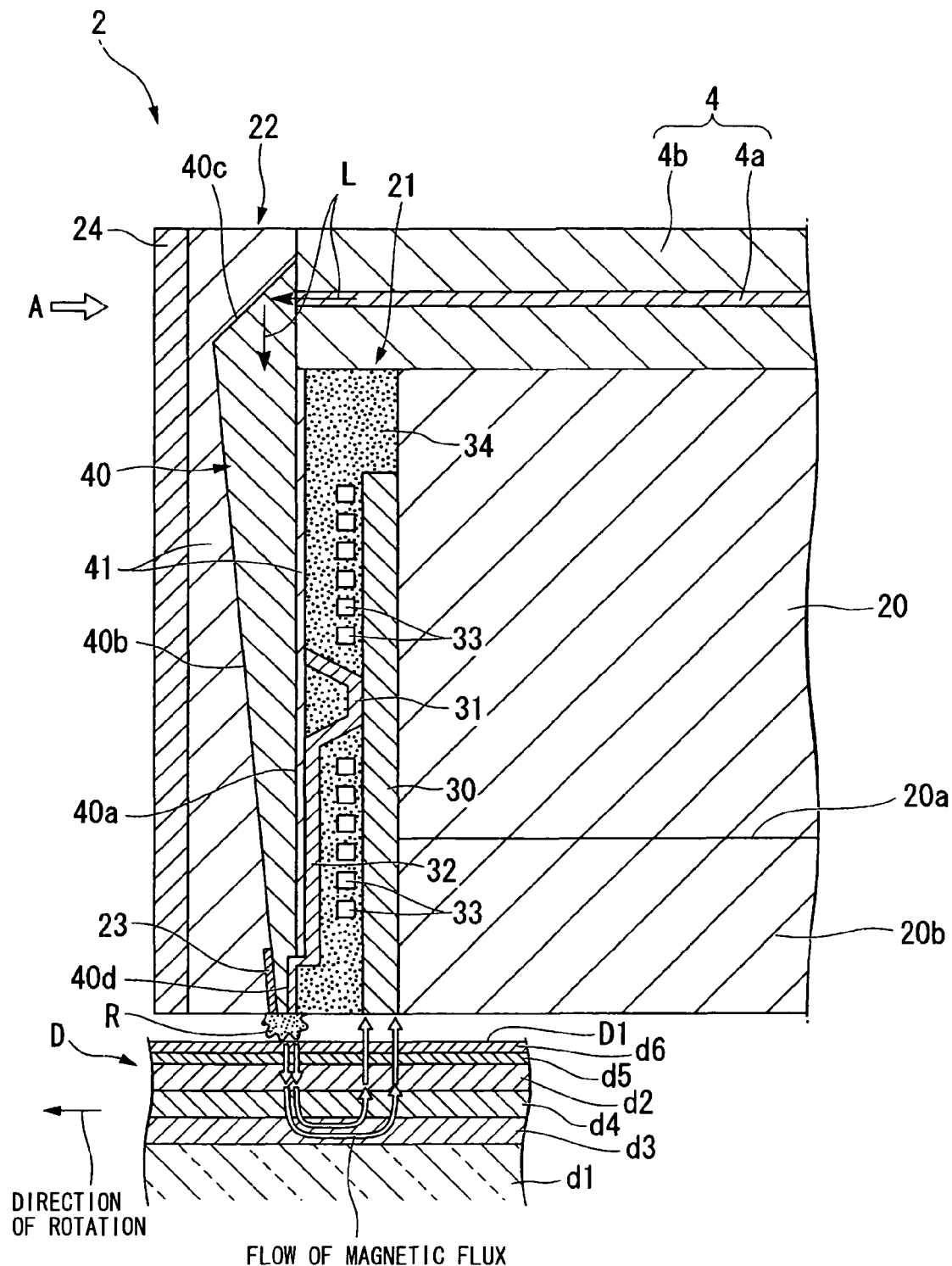
[FIG. 4] It is an enlarged sectional view of a side surface of the near field optical head shown in FIG. 2 on an trailing edge side, showing a relation between near field light and a recording magnetic field in carrying out record.

The near field optical head 2 is provided so as to be faced to the disc D, floating from the disc surface D1 by a predetermined distance H, as shown in FIGS. 2 to 4. The near field optical head 2 comprises a slider 20 including a facing surface 20a faced to the disc surface D1, a recording element 21 fixed to a top end surface (referred to as a side surface on an trailing edge end side) of the slider 20, a light flux transmission element 22 fixed adjacently to the recording element 21, a metal film 23 formed on a later-mentioned core 40 of the light flux transmission element 22 for generating the near field light R from a light flux L and an optical waveguide 4 for introducing the light flux L from the light signal controller 5 into the core 40 of the light flux transmission element 22. The near field optical head 2 in the embodiment comprises a reproducing element 24 fixed adjacently to the light flux transmission element 22.

The slider 20 is formed from a light transmissible material such as quartz glass or ceramics such as AlTiC (altic) and the like into the shape of a rectangular parallelepiped. The slider 20 is held so as to hang from a top end of the beam 3 through a gimbal part 25 with the facing surface 20a faced to a disc D side. The gimbal part 25 is a component whose movement is controlled so as to be displaced only about an axis X and an axis Y. This allows the slider 20 to freely rotate about the two axes (the axes X and Y) parallel to the disc surface D1, the two axes crossing at right angles with each other, as described above.

On the facing surface 20a of the slider 20, formed is a convex line part 20b for generating pressure for floating by using viscosity of an air flow caused by the rotating disc D. In the embodiment, exemplified is a case in which two convex line parts 20b extending along a longitudinal direction so as to form a line into the shape of a rail is formed. The embodiment, however, is not limited to the case. Any concave and convex shape is possible so long as a positive pressure for separating the slider 20 from the disc surface D1 and negative pressure for attracting the slider 20 to the disc surface D1 are designed to be adjusted so that the slider 20 would be floated under an optimal condition. A surface of the convex line part 20b is made an ABS (air bearing surface).

The slider 20 receives force for floating from the disc surface D1 through the two convex line parts 20b. The beam 3 is arranged to be bent in the direction Z perpendicular to the disc surface D1 to absorb floating force of the slider 20. That is to say, the slider 20 receives force pushing the slider 20 toward the disc surface D1 by means of the beam 3 in floating. Accordingly, the slider 20 is arranged to float under a condition that the slider 20 is separated from the disc surface D1 by the predetermined distance H, as described above, due to the balance of force between both of the above. Furthermore, the slide 20 is arranged to rotate about the axis X and the axis Y by means of the gimbal part 25. This causes the slider 20 to float with a position of the slider 20 being constantly stable.

The air flow generated in accordance with rotation of the disc D flows from an leading edge side (a base end side of the beam 3) of the slider 20, flows along the ABS, and then, exits from an trailing edge end side (a top end side of the beam 3) of the slider 20.

The recording element 21 comprises an auxiliary magnetic pole (return pole) 30 fixed to a side surface of the slider 20 on the trailing edge end side, a main magnetic pole 32 connected to the auxiliary magnetic pole 30 via a magnetic circuit 31 to generate a recording magnetic field perpendicular to the disc D between the main magnetic pole 32 and the auxiliary magnetic pole 30 and the coil 33 for spirally winding around the magnetic circuit 31, as shown in FIG. 4. That is to say, the auxiliary magnetic pole 30, the magnetic circuit 31, the coil 33 and the main magnetic pole 32 are provided in this order from the trailing edge end side of the slider 20 so as to be lined in the longitudinal direction of the slider 20.

The both magnetic poles 30 and 32 and the magnetic circuit 31 are formed from a high saturation magnetic flux density (Bs) material (CoNiFe alloy, CoFe alloy and the like, for example). The coil 33 is provided so that there would be gaps between adjacent coil lines, between the coil 33 and the magnetic circuit 31 and between the both magnetic poles 30 and 32 in order to prevent a short circuit. The coil 33 is molded by means of an insulator 34 under the above condition. Moreover, the coil 33 is arranged to be supplied from the control part 8 with an electric current modulated in accordance with the information. That is to say, the magnetic circuit 31 and the coil 33 form an electromagnet as a whole. The main magnetic pole 32 and the auxiliary magnetic pole 30 are designed so that an end surface faced to the disc D would be in the same plane as the ABS of the slider 20.

A top end of the main magnetic pole 32 bends to a later-mentioned core 40 side of the light flux transmission element 22. It is arranged to be exposed to another end side of the core 40 under the condition that the top end is embedded in the core 40. Concretely, the top end side of the main magnetic pole 32 is fitted into an insertion groove 40d formed in the core 40 while being inserted into and fixed to the insertion groove 40d formed in the core 40.

The light flux transmission element 22 is an element for reflecting therein the light flux L introduced from one end side while transmitting the light flux L to the other end side, as shown in FIGS. 5 to 9. The light flux transmission element 22 is formed from the core 40 formed into the shape of a half column and a cladding 41 for confining the core 40 therein. The light flux transmission element 22 is formed into a substantially plate-like shape as a whole.

Figure 5:
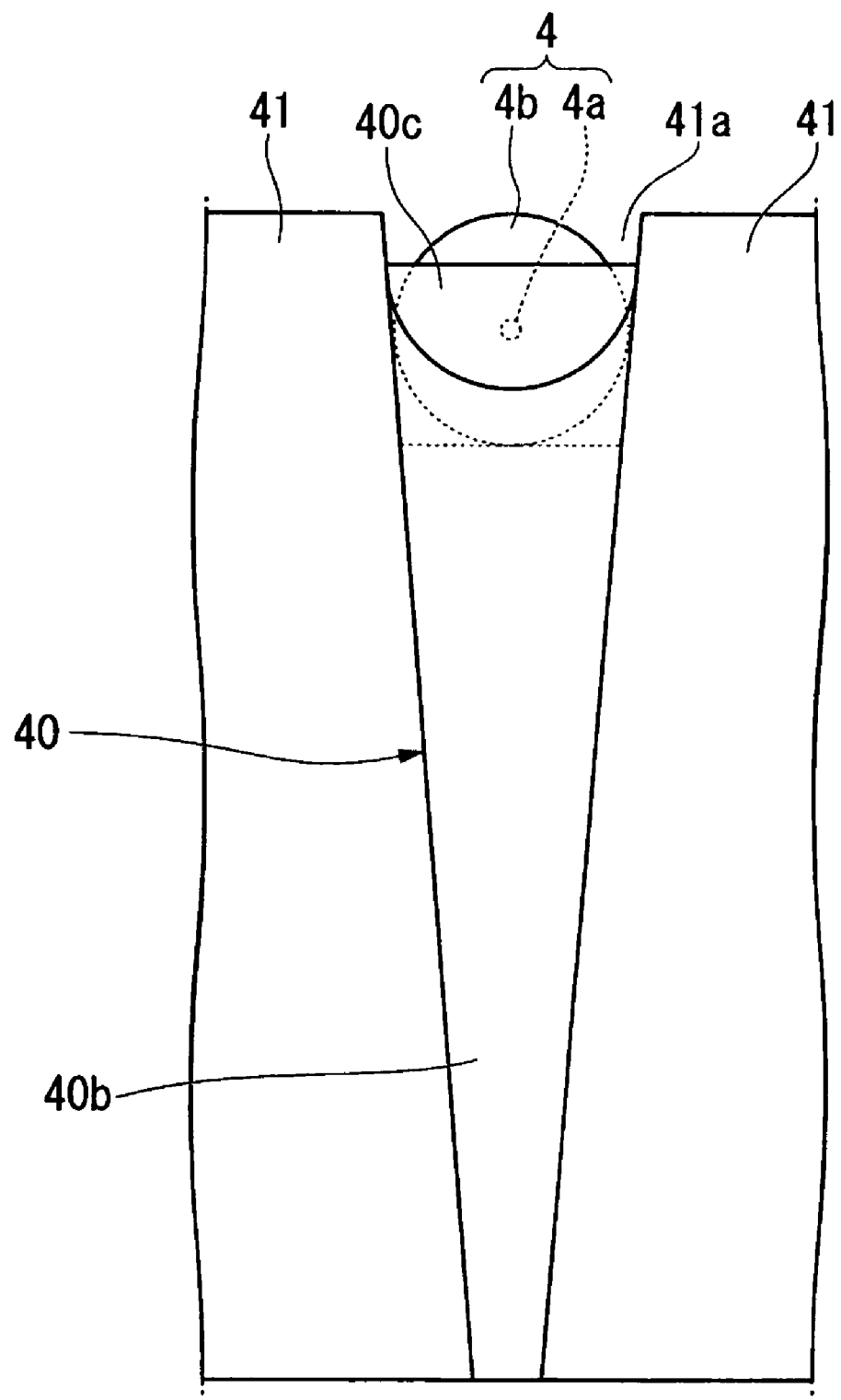
[FIG. 5] It illustrates a core of a light flux transmission element shown in FIG. 4 in a view from an arrow A.
Figure 6:
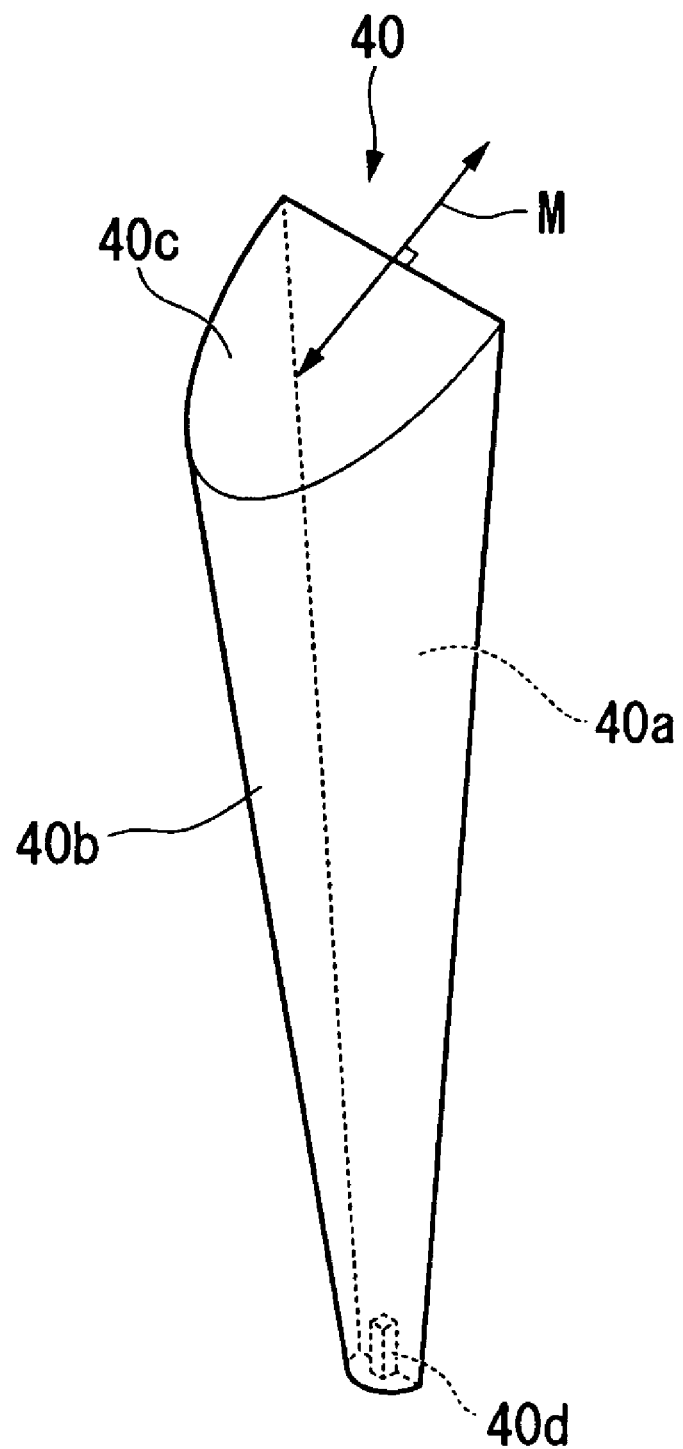
[FIG. 6] It is a perspective view of the core shown in FIG. 5.
Figure 7:
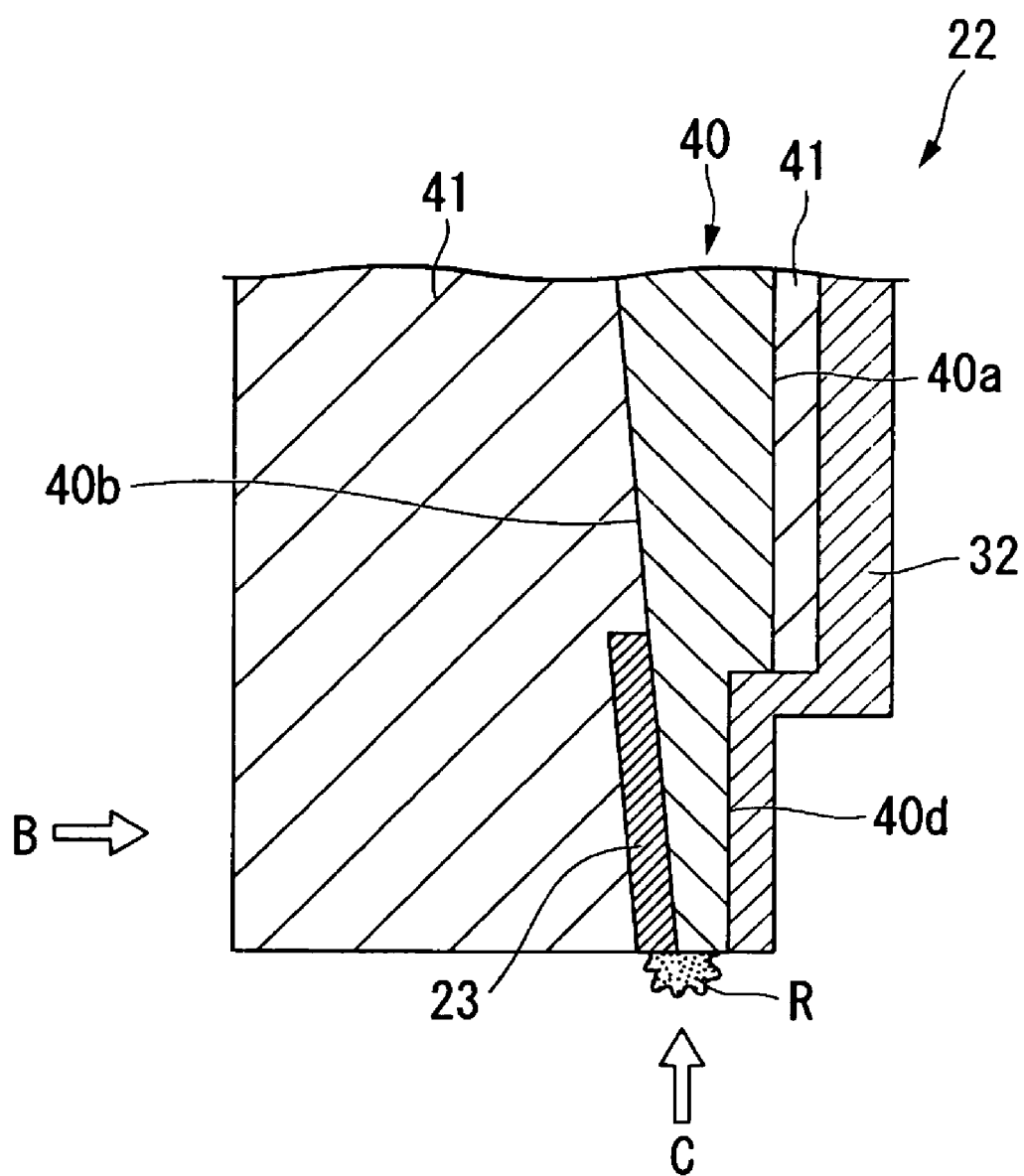
[FIG. 7] It is an enlarged view of another end side of the light flux transmission element shown in FIG. 4.
Figure 8:
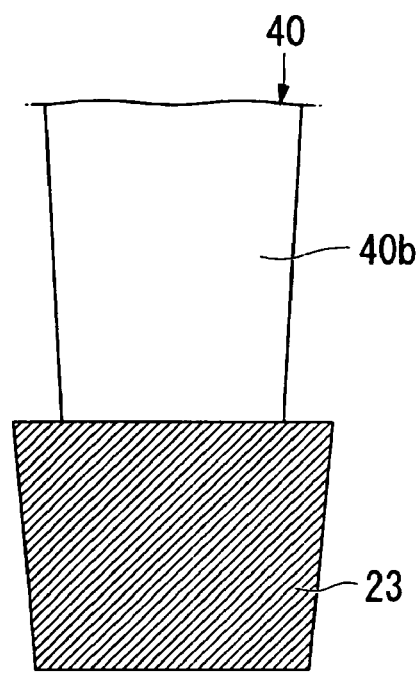
[FIG. 8] It illustrates the core and the metal film, which are shown in FIG. 7, in a view from an arrow B.
Figure 9:
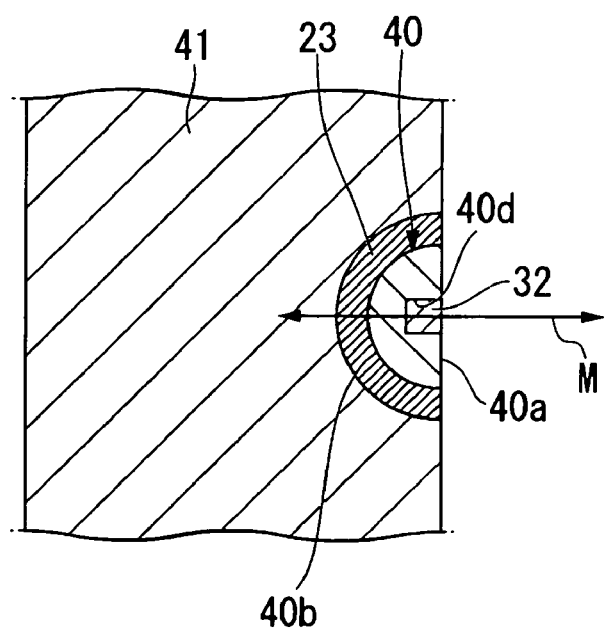
[FIG. 9] It illustrates the light flux transmission element shown in FIG. 7 in a view from an arrow C.

FIG. 5 illustrates the core 40 in a view from an arrow A shown in FIG. 4. FIG. 6 is a perspective view of a single body of the core 40. FIG. 7 is an enlarged view of the periphery of the light flux transmission element 22 shown in FIG. 4 on the other end side. FIG. 8 illustrates the core 40 and the metal film 23, which are shown in FIG. 7, in a view from an arrow B. FIG. 9 illustrates the light flux transmission element 22 shown in FIG. 7 in a view from an arrow C, which is the disc D side.

One end of the light flux transmission element 22 is faced upward with respect to the slider 20 while the other end is faced to the disc D side and fixed adjacently to the recording element 21, as shown in FIG. 4. More concretely, the light flux transmission element 22 is fixed adjacently to the main magnetic pole 32 with its position adjusted so that a later-mentioned flat surface 40a of the core 40 would be faced to the main magnetic pole 32.

The core 40 is for reflecting therein the light flux L introduced from one end while transmitting the light flux L to the other end, as shown in FIGS. 5 to 9. The core 40 is formed from the flat surface 40a and a curved surface 40b into the shape of a half column. That is to say, the core 40 is formed so that a cross section crossing at right angles in the longitudinal direction would be in the shape of a half column. On one end of the core 40, formed is a reflection surface 40c for reflecting the light flux L introduced by means of the optical waveguide 4 toward a direction different from an introduced direction (so that a direction of the light flux L would be changed by substantially 90 degrees, for example). The reflection surface 40c allows the light flux L introduced from the optical waveguide 4 to be repeatedly reflected and transmitted to the other end.

Moreover, in the vicinity of the core 40 on the other end side, formed is the insertion groove 40d into which a top end of the main magnetic pole 32 is inserted and fitted. The insertion groove 40d is formed to communicate with the other end faced to the disc D.

The core 40 in the embodiment is formed so as to be tapered from one end to the other end. Accordingly, a spot size of the light flux L can be gradually lowered to a smaller size in transmitting the light flux L. That is to say, the core 40 plays a role of converting the spot size of the light flux L.

The cladding 41 is formed from a material having the refractive index lower than that of the core 40. The cladding 41 adheres closely to the core 40 with at lease the other end of the core 40 being exposed to the outside to confine therein the core 40, as shown in FIG. 4. This results in no gap between the core 40 and the cladding 41. Moreover, the cladding 41 in the embodiment is provided with a groove part 41a on one end of the core 40 and designed so that a part of the one end of the core 40 would be exposed to the outside, as show in FIG. 5.

Now, described will be an example of combination between materials used for the cladding 41 and the core 40. For example, considered can be a combination between the core 40 made of quartz ($SiO_2$) and the cladding 41 made of quartz doped with fluorine. In this case, the refractive index of the core 40 is 1.47 while the refractive index of the cladding 41 is less than 1.47 when the wavelength of the light flux L is 400 nm. This is a preferable combination. Furthermore, a combination between the core 40 formed from quartz doped with germanium and the cladding 41 formed from quarts ($SiO_2$) can be also considered. In this case, the refractive index of the core 40 is more than 1.47 while the refractive index of the cladding 41 is 1.47 when the wavelength of the light flux L is 400 nm. This is also a preferable combination.

Especially, the more a difference in refractive index between the core 40 and the cladding 41 is, the more the force for confining the light flux L in the core 40. Accordingly, it is more preferable to use tantalum oxide ($Ta_2O_5$: the refractive index is 2.16 when the wavelength is 550 nm) for the core 40 and use quarts and such for the cladding 41 to increase the difference in refractive index between both of the above. In the case of using the light flux L in an infrared region, it is also effective to form the core 40 from silicon (Si: the refractive index is around 4), which is a material transparent to the infrared light.

The metal film 23 is formed into a predetermined thickness on a curved surface 40b of the core 40 in the vicinity of at least the other end, as shown in FIGS. 4, 7 and 9. The metal film 23 generates the near field light R having high light intensity from the light flux L having been transmitted in the core 40. The metal film 23 is also arranged to be able to localize the generated near field light R on a field surface between the metal film 23 and the curved surface 40b of the core 40. This will be described in detail later.

As such a metal film 23, considerable are a gold film, a silver film, a platinum film and the like, for example. Especially, the gold film is preferable because of resistance to oxidation and superiority in endurance.

The optical waveguide 4 is a waveguide formed from the core 4a and the cladding 4b, as shown in FIGS. 4 and 5. In the optical waveguide 4, the light flux L is transmitted in the core 40. The optical waveguide 4 is inserted into and fixed to the groove part 41a formed in the cladding 41 and a groove part, which is not shown and which is formed on a top surface of the slider 20. This causes the optical waveguide 4 to be provided in parallel to the slider 20.

Moreover, the top end of the optical waveguide 4 is connected to one end of the light flux transmission element 22 to introduce the light flux L into the core 40. The base end of the optical waveguide 4 is led to the light signal controller 5 via the beam 3, the carriage 11 and such, and then, connected to the light signal controller 5.

A positional relation between the light flux transmission element 22 and the optical waveguide 4 is adjusted so that the light flux L introduced from the optical waveguide 4 into the core 40 would be incident on a substantial center of the reflection surface 40c, as shown in FIG. 5.

The light signal controller 5 is arranged to introduce the light flux L of straight polarized light in introducing the light flux L into the core 40 through optical waveguide 4. In detail, the light signal controller 5 is designed so that the light flux L whose polarization direction is adjusted to a straight direction M substantially perpendicular to the flat surface 40a of the core 40 would be introduced into the core 40, as shown in FIGS. 6 and 9.

The reproducing element 24 is a magnetic resistance effect film in which electric resistance is changed in accordance with a size of the magnetic field leaked from the perpendicular recording layer d2 of the disc D. The reproducing element 24 is supplied with a bias current from the control part 8 through a lead film and such, which are not shown. This allows the control part 8 to detect a change in magnetic field leaked from the disc D as a change in voltage, so that a signal can be reproduced in accordance with the change in voltage.

The disc D in the embodiment uses a perpendicular double layer film disc comprising at least two layers of the perpendicular recording layer d2 having a magnetization easy axis in a direction perpendicular to the disc surface D1 and a soft magnetism layer d3 formed from a material having high magnetic permeability. As such a disc D, used is a disc in which the soft magnetism layer d3, a middle layer d4, the perpendicular recording layer d2, a protection layer d5 and a lubricating layer d6 are formed on a base board d1 in order, as shown in FIG. 2, for example.

As the base board d1, used is an aluminum base board, a glass base board and the like, for example. The soft magnetism layer d3 is a layer having a high magnetic permeability. The middle layer d4 is a crystal control layer of the perpendicular recording layer d2. The perpendicular recording layer d2 is a perpendicular anisotropic magnetism layer. A CoCrPt alloy, for example, is used for the perpendicular recording layer d2. The protection layer d5 is for protecting the perpendicular recording layer d2. A DLC (diamond like carbon) film, for example, is used for the protection layer d5. For the lubricating layer d6, used is a fluorine liquid lubricating material, for example.

Now, described hereinafter will be a case of recording and reproducing various kinds of information of the disc D by means of the information recording and reproducing device 1 having such a structure.

First, the spindle motor 7 is driven to rotate the disc D in a fixed direction. The actuator 6 is then operated to move the beam 3 for scanning in the direction XY through the carriage 11. This allows the near field optical head 2 to be located at a desirable position on the disc D. At that time, the near field optical head 2 receives floating force from the two convex line parts 20b formed on the faced surface 20a of the slider 20 while being pushed down to the disc D side with predetermined force by means of the beam 3 and such. A balance of both of the force causes the near field optical head 2 to be floated in a position away from the disc D by the predetermined distance H, as shown in FIG. 2.

Displacement of the near field optical head 2 in the direction Z is absorbed by means of the beam 3 while the near field optical head 2 can be displaced about the axes X and Y by means of the gimbal part 25 even in the case that the near field optical head 2 receives wind pressure caused by undulation of the disc D. Accordingly, the wind pressure caused by the undulation can be absorbed. This allows the near field optical head 2 to be stably floated.

In recording information, the control part 8 operates the light signal controller 5 and supplies the coil 33 with an electric current modulated in accordance with the information.

First, the light signal controller 5 receives an instruction from the controller 8 to make the straight polarized light flux L incident from the base end of the optical waveguide 4. The incident light flux L advances in the core 40 of the optical waveguide 4 toward the top end to be introduced into the core 40 from one end side of the light flux transmission element 22, as shown in FIG. 4. At that time, the light flux L is introduced into the core 40 in a direction parallel to the slider 20. The introduced light flux L is reflected on the reflection surface 40c to change its direction by substantially 90 degrees. The light flux L whose direction has been changed repeats the reflection in the half-columned core 40 to be transmitted to the other end located on the disc D side.

In this case, the core 40 is formed so as to be tapered from one end to the other end. Accordingly, the light flux L is gradually converged in the transmission to the other end with repeated reflection. This causes the light flux L to be gradually narrowed down in accordance with the transmission to be reduced in spot size. Especially, the light flux L is not leaked to the outside of the core 40 on the way of transmission since the cladding 41 closely adheres to the core 40. This allows the introduced light flux L to be transmitted with no uselessness.

The light flux L having a reduced spot size is incident on the metal film 23 formed on the curved surface 40b of the core 40 after advancing to the vicinity of the other end of the core 40. Surface plasmon is then excited in the metal film 23. The excited surface plasmon is increased by a resonance effect to be transmitted to the other end of the core 40 along a field surface between the metal film 23 and the core 40 (the curved surface 40b of the core 40, in detail). The excited surface plasmon becomes the near field light R having a high light intensity to be leaked to the outside at a point of time when it reaches the other end. This allows the near field light R to be localized in the field surface between the curved surface 40b of the core 40 and the metal film 23.

Figure 10:
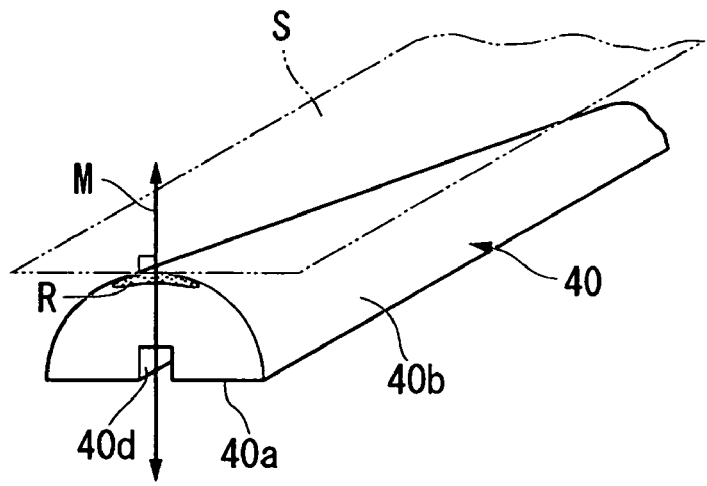
[FIG. 10] It illustrates a relation between the core and a direction of polarization of a light flux introduced into the core.

The light signal controller 5 introduces the light flux L into the core 40, the light flux L whose direction of polarization is adjusted into a straight direction M substantially perpendicular to the flat surface 40a of the core 40. Accordingly, the near field light R is not evenly generated all over the curved surface of the metal film 23 formed on the curved surface 40b of the core 40. The near field light R is collectively generated along a virtual surface S orthogonal to a direction M of straight polarization, as shown in FIG. 10. This does not cause the near field light R to be localized all over the field surface between the curved surface 40b of the core 40 and the metal film 23, but allows the near field light R having high intensity of light to be generated collectively at a part of the field surface, as shown in FIG. 11.

Figure 11:
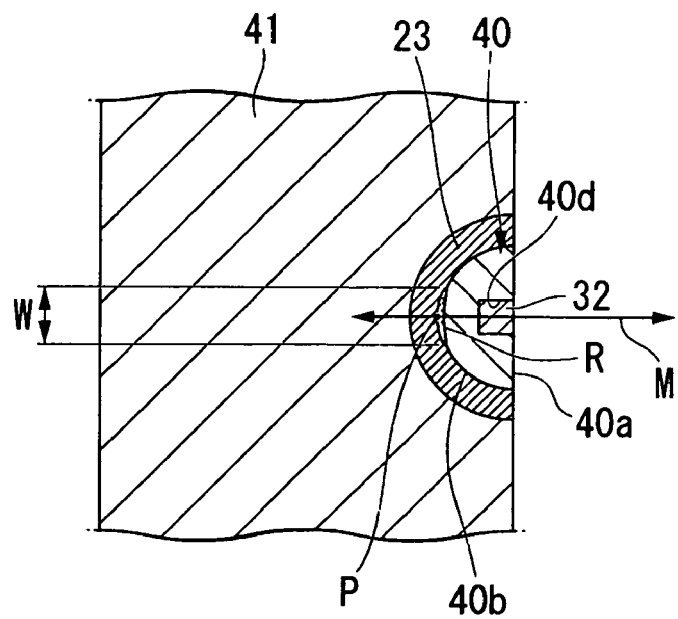
[FIG. 11] It illustrates the light flux transmission element shown in FIG. 7 in a view from the arrow C, showing a condition of localization of the near field light.

That is to say, the near field light R is most collectively localized at a point P shown in FIG. 11. The more the near field light R is away from the point P along the field surface between the curved surface 40b of the core 40 and the metal film 23, the more the near field light R is decreased. As a result, the near field light R can be localized collectively at a part of the field surface, as shown in FIG. 11.

The top end of the main magnetic pole 32 is exposed to the other end while it is embedded in the core 40. This allows the near field light R to be generated at a position extremely close to the main magnetic pole 32. The disc D is then locally heated by the near field light R to be temporarily reduced in the coercivity. Especially, the coercivity of the disc D can be reduced in the vicinity of the main magnetic pole 32 since the near field right R is generated in a position extremely close to the main magnetic pole 32.

On the other hand, an electric current magnetic field generates a magnetic field in the magnetic circuit 31 according to principles of electromagnet when the coil 33 is supplied with an electric current by means of the control part 8 at the same time as the above-mentioned introduction of the light flux L. This allows the recording magnetic field perpendicular to the disc D to be generated between the main magnetic pole 32 and the auxiliary magnetic pole 30. The magnetic flux generated on a main magnetic pole 32 side then straightly passes through the perpendicular recording layer d2 of the disc D to reach the soft magnetism layer d3, as shown in FIG. 4. This allows record to be performed with the magnetization of the perpendicular recording layer d2 being faced vertically to the disc surface D1. The magnetic flux having reached the soft magnetism layer d3 returns to the auxiliary magnetic pole 30 via the soft magnetism layer d3. At that time, no influence has been given on the direction of the magnetization in returning to the auxiliary magnetic pole 30. This is because no force for reversing the magnetization is generated since the area of the auxiliary magnetic pole 30 faced to the disc surface D1 is larger than that of the main magnetic pole 32, and thereby, the magnetic flux density is high. That is to say, record can be carried out only on the main magnetic pole 32 side.

As a result, information can be recorded in a hybrid magnetic recording method in which the near field light R and the recording magnetic field generated in the both magnetic poles 30 and 32 are cooperated. Further, recording in the perpendicular recording method contributes to difficulty in receiving influence such as a thermal fluctuation phenomenon, and thereby, to stable record. Accordingly, reliability in writing can be enhanced.

Especially, the coercivity of the disc D can be reduced in a position extremely close to the main magnetic pole 32. This allows a peak position of the heating temperature to exist at a position where the recording magnetic field operates locally. Accordingly, recording can be certainly performed while recording with high density can be achieved.

Next, in the case of reproducing the information recorded in the disc D, the reproducing element 24 fixed adjacently to the light flux transmission element 22 receives the magnetic field leaked from the perpendicular recording layer d2 of the disc D, so that electric resistance is changed in accordance with a size of the received magnetic field. This causes the voltage of the reproducing element 24 to be changed. Accordingly, the control part 8 can detect a change in magnetic field leaked from the disc D as a change in voltage. The control part 8 can reproduce the information by reproducing a signal in accordance with a change in voltage.

In accordance with the near field optical head 2, the light flux L can be efficiently converged to generate the near field light R, so that reliability in writing can be improved, as described above. Furthermore, recording with high density can be achieved since the near field light R having high intensity of light can be generated in a position extremely close to the main magnetic pole 32.

Particularly, introducing the straight polarization light flux L whose polarization direction is adjusted for the core 40 formed into the shape of a half column causes the near field light R to be collectively generated at a part of the field surface between the curved surface 40b of the core 40 and the metal film 23. That is to say, a characteristic of light is used for collectively generate the near field light R. Accordingly, even in the case that the respective components such as the light flux transmission element 22 and the metal film 23 are not formed with high processing precision, the near field light R having high intensity can be stably generated without being influenced by such a physical design.

Therefore, manufacture is comparatively easy and a cost can be prevented from rising, and in addition, stable record with high density can be achieved.

Especially, the width W of the near field light R can be easily shortened with little influence of the processing precision, as shown in FIG. 11, since a characteristic of light is used to partially generate the near field light R. This allows a width of track of the disc D to be made small, so that record with high density can be easily achieved. Moreover, the core 40 in accordance with the embodiment is formed so as to be tapered toward the other end. Accordingly, the light flux L having a small spot size can be made incident on the metal film 23 and the surface plasmon is efficiently excited. The near field light R can be efficiently generated also at this point of view. This allows record with higher density to be achieved.

Moreover, the optical waveguide 4 fixed to the slider 20 is used to introduce the light flux L into the light flux transmission element 22. This is different from a conventional case. The light flux L can be stably introduced even in the case that the position of the slider 20 fluctuates due to undulation of the disc D with no influence of the fluctuation of the position. This allows the reliability in writing to be improved.

Furthermore, the recording element 21, the light flux transmission element 22 and the reproducing element 24 are provided in this order on a side surface on an trailing edge end of the slider 20. This prevents the respective components other than the optical waveguide 4 from being overlapped in a direction of the thickness of the slider 20. Accordingly, the near field optical head 2 can be designed compactly, so that thinning in size can be achieved.

In addition, the groove part 41a is formed in the cladding 41 in the near field optical head 2 in accordance with the embodiment. Accordingly, it is possible to use the groove 41a to introduce the light flux L into the core 40 directly without passing through the cladding 41. This allows the light flux L to be introduced with a loss being suppressed as much as possible. The disc D can be efficiently heated also in this point of view.

According to the information recording and reproducing device 1 in accordance with the embodiment, reliability in writing is high and correspondence to record with high density is possible since the near field optical head 2 is provided. This contributes to improvement in quality at the same time as thinning in size.

(Second Embodiment)

Figure 12:
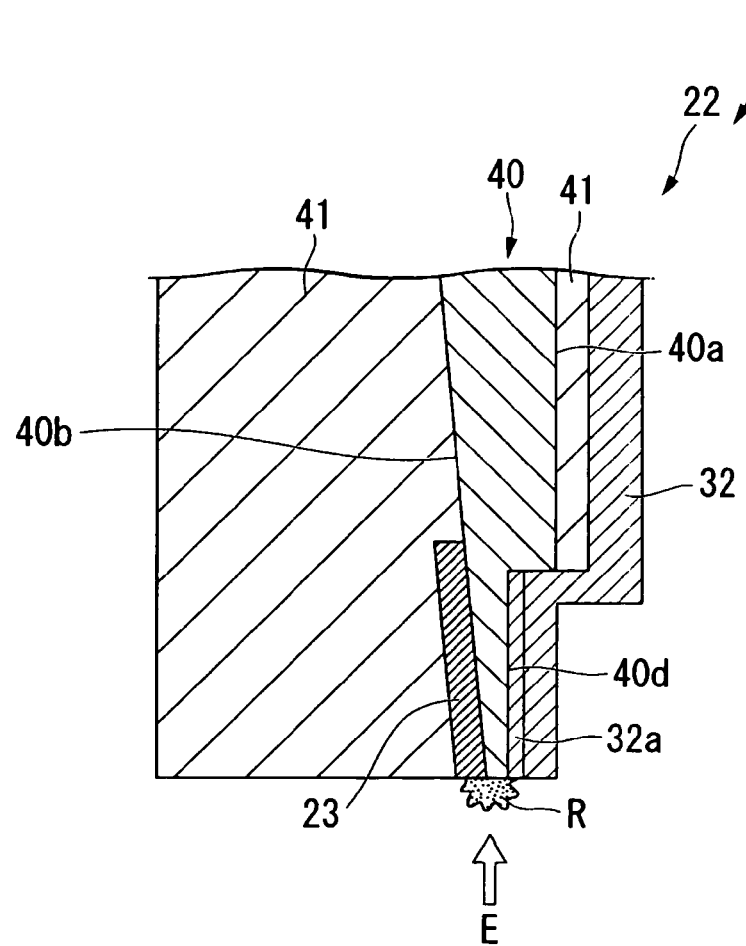
[FIG. 12] It is a partially enlarged sectional view of a near field optical head in which a part of a main magnetic pole on a top end side is a curved surface, showing a second embodiment of the invention.
Figure 13:
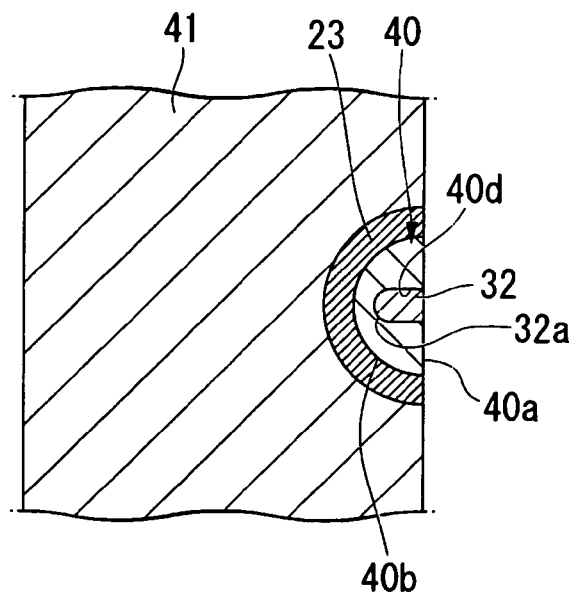
[FIG. 13] It illustrates the light flux transmission element shown in FIG. 12 in a view from an arrow E.

Now, described will be a second embodiment, made reference with FIGS. 12 and 13. In the second embodiment, components same as those in the first embodiment are marked with the same signs and references to be omitted from description. A difference between the second embodiment and the first embodiment is a shape of the top end of the main magnetic pole 32.

That is to say, a cross section of the top end of the main magnetic pole 32 in the first embodiment is formed into a quadrilateral shape while a near field optical head 50 in the second embodiment comprises the magnetic pole 32 having a curved surface 32a, at least a part of the top end of the curved surface 32a swelling out toward the metal film 23, as shown in FIGS. 12 and 13. FIG. 13 illustrates a light flux transmission element 22 shown in FIG. 12 in a view from a direction of an arrow E. Accordingly, the metal film 23 can be made closer to the main magnetic pole 32 than a case of the first embodiment. This allows the near field light R localized in the field surface between the curved surface 40b of the core 40 and the metal film 23 to be generated more closely to the main magnetic pole 32. Therefore, the near field light R and the recording magnetic field can be made further efficiently cooperate, so that record with higher density can be achieved.

(Third Embodiment)

Figure 14:
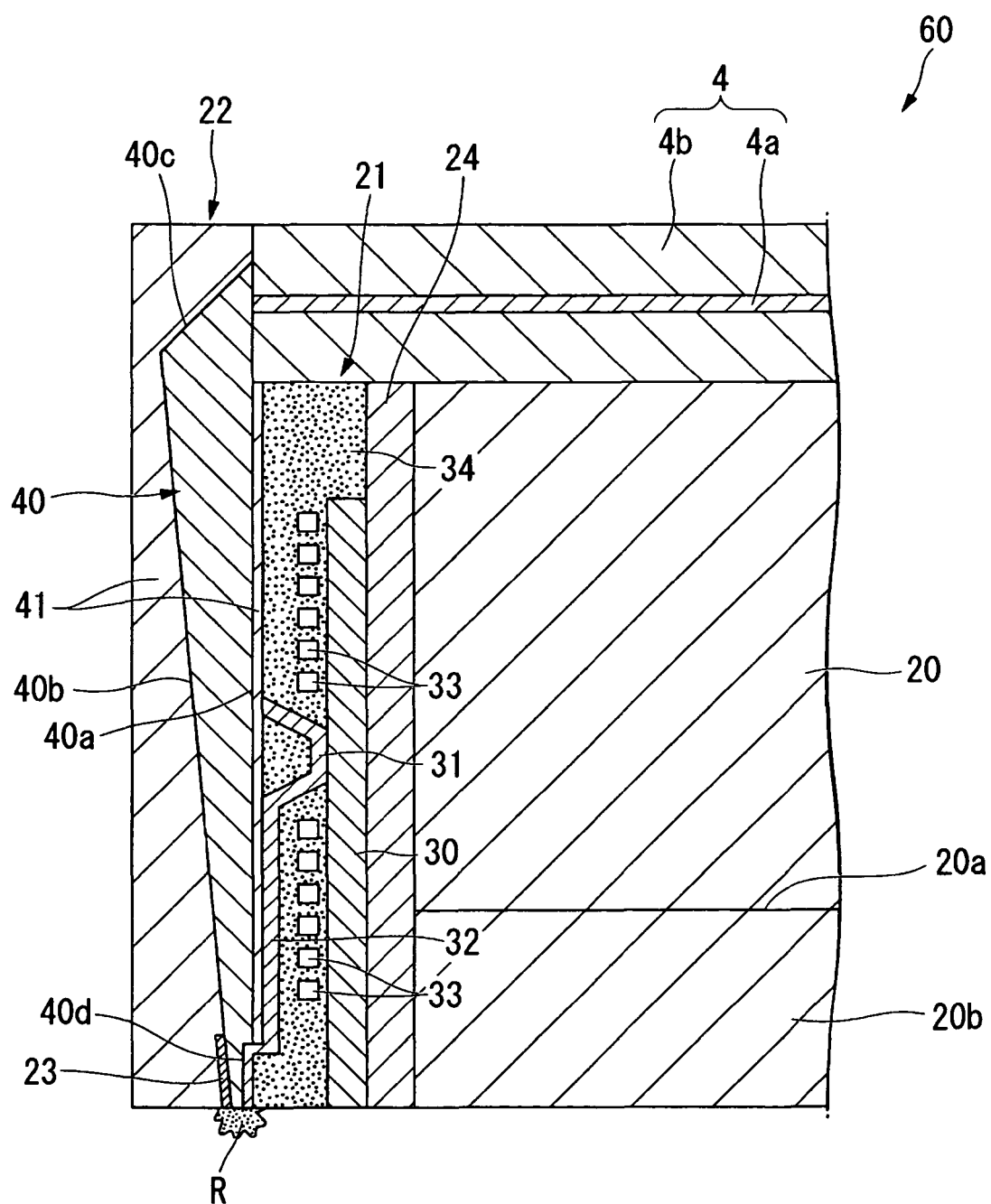
[FIG. 14] It is an enlarged sectional view of a side surface of a near field optical head on an trailing edge end side, the near field optical head having a reproducing element provided between a slider and a recording element, showing a third embodiment of the invention.
Figure 15:
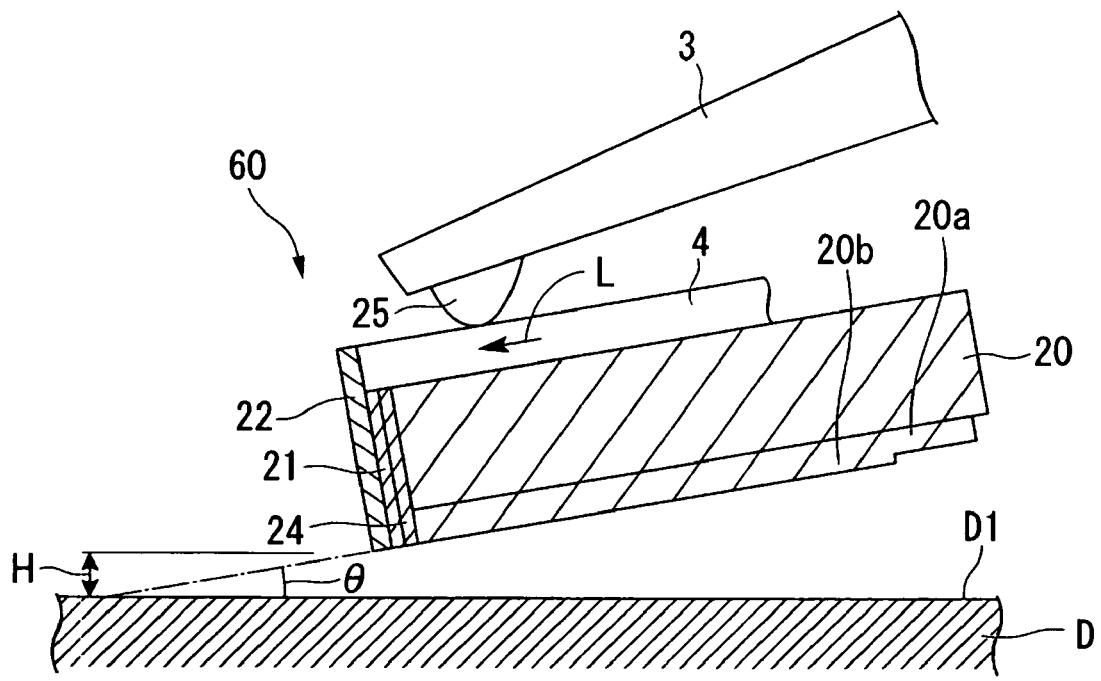
[FIG. 15] It illustrates the near field optical head shown in FIG. 14, the near field optical head obliquely floating above a disc.

Now, described will be a third embodiment, made reference with FIGS. 14 and 15. In the third embodiment, components same as those in the first embodiment are marked with the same signs and references to be omitted from description.

A difference between the third embodiment and the first embodiment is a point that the recording element 21, the light flux transmission element 22 and the reproducing element 24 are fixed in this order from the side surface of the slider 20 on the trailing edge side in the first embodiment while the reproducing element 24, the recording element 21 and the light flux transmission element 22 are fixed in this order from the side surface of the slider 20 on the trailing edge side in the case of a near field optical head 60 in the third embodiment.

That is to say, the reproducing element 24 of the near field optical head 60 in the third embodiment is provided between the side surface of the slider 20 on the trailing edge side and the recording element 21, as shown in FIG. 14. Accordingly, the light flux transmission element 22 and the recording element 21 are moved to the trailing edge side of the slider 20 by the thickness of the reproducing element 24, differently from the first embodiment.

Now, described further in detail will be a position of the slider 20 in floating. The slider 20 is not horizontal but slightly oblique with respect to the disc surface D1, as shown in FIG. 15. Concretely, the slider 20 slants so that an angle θ between the disc surface D1 and ABS of the slider 20 would keep a minute angle (about 1° to 5°, for example) with the trailing edge end close to the disc D. Accordingly, the distance H between the slider 20 and the disc surface D1 gradually increases from the trailing edge end to the leading edge of the slider 20. This means that the trailing edge end of the slider 20 is closest to the disc surface D1.

Therefore, according to the near field optical head 60 in accordance with the third embodiment, the light flux transmission element 22 and the recording element 21 can be made closer to the disc surface D1, compared with the case of the first embodiment, since the light flux transmission element 22 and the recording element 21 are closer to the trailing edge end of the slider 20. This allows the near field light R and the recording magnetic field to be made more efficiently operate on the disc D, so that record with higher density can be achieved. Other operation and effect are similar to those of the first embodiment.

(Fourth Embodiment)

Figure 16:
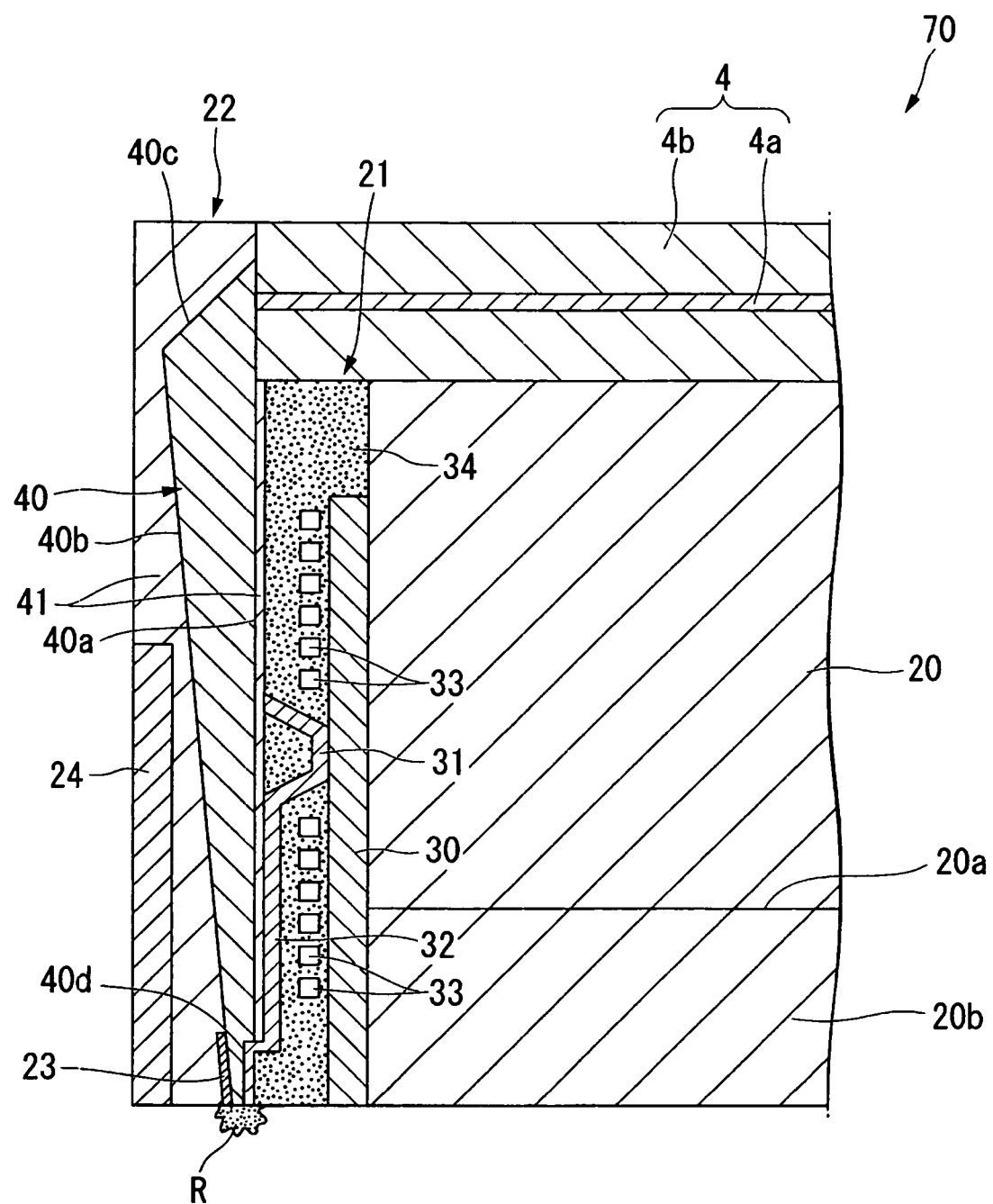
[FIG. 16] It is an enlarged sectional view of a side surface of a near field optical head on an trailing edge end side, the near field optical head having a reproducing element provided so as to be embedded in a cladding of a light flux transmission element, showing a fourth embodiment of the invention.

Now, described will be a fourth embodiment of the invention, made reference to FIG. 16. In the fourth embodiment, components same as those in the first embodiment are marked with the same signs and references to be omitted from description.

A difference between the fourth embodiment and the first embodiment is a point that the recording element 21, the light flux transmission element 22 and the reproducing element 24 are fixed in this order from the side surface of the slider 20 on the trailing edge side in the first embodiment while the reproducing element 24 is provided so as to be embedded in the cladding 41 of the light flux transmission element 22 in the case of a near field optical head 70 in the fourth embodiment.

That is to say, the reproducing element 24 of the near field optical head 70 in accordance with the fourth embodiment is embedded in a part of the cladding 41 in which the core 40 is confined, as shown in FIG. 16. This allows the thickness of the reproducing element 24 to be absorbed by the cladding 41, so that the light flux transmission element 22 and the recording element 21 can be made closer to the trailing edge end of the slider 20 similarly to a case of the third embodiment. Accordingly, the light flux transmission element 22 and the recording element 21 can be made closer to the disc surface D1, compared with the case of the first embodiment, when the slider 20 inclines and floats. This allows the near field right R and the recording magnetic field to be made more efficiently operate on the disc D, so that record with higher density can be achieved. Other operation and effect are similar to those of the first embodiment.

(Fifth Embodiment)

Figure 17:
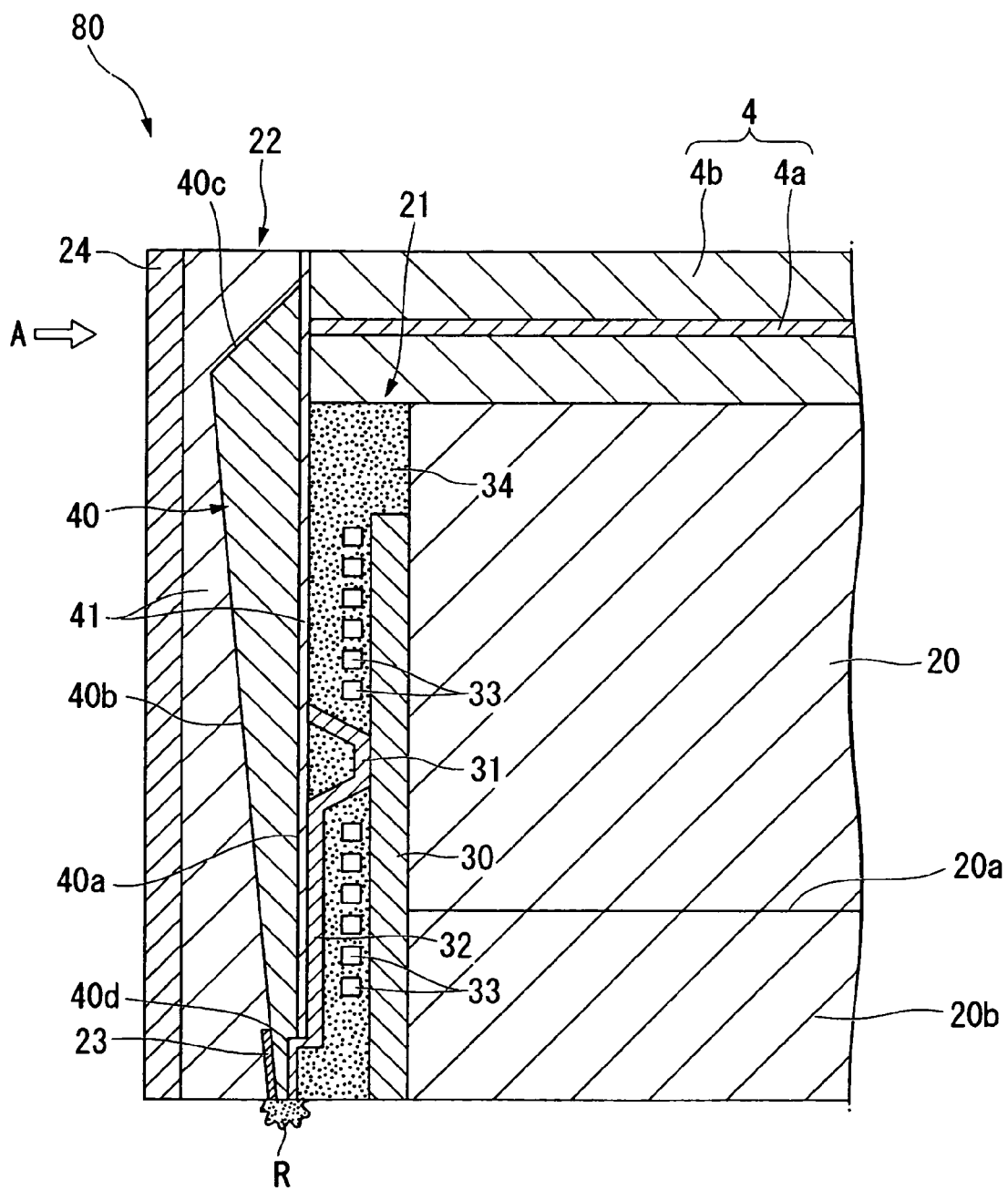
[FIG. 17] It is an enlarged sectional view of a side surface of a near field optical head on an trailing edge end side, the near field optical head in which one end of a core of a light flux transmission element is covered with a cladding, showing a fifth embodiment of the invention.

Now, described will be a fifth embodiment of the invention, made reference to FIG. 17. In the fifth embodiment, components same as those in the first embodiment are marked with the same signs and references to be omitted from description.

A difference between the fifth embodiment and the first embodiment is a point that one end of the core 40 is exposed to the outside through the groove part 41a formed in the cladding 41 in the first embodiment while one end of the core 40 is covered with the cladding 41 in the case of a near field optical head 80 in the fifth embodiment.

That is to say, one end of the core 40 is covered with the cladding 41, as show in FIG. 17, in the light flux transmission element 22 of the near field optical head 80 in accordance with the fifth embodiment. Accordingly, the light flux L having advanced in the core 40 of the optical waveguide 4 is arranged to pass through the cladding 41, and then, be introduced into the core 40 of the light flux transmission element 22. The fifth embodiment also has operations and effects similar to those of the first embodiment. In addition to the above, it is not necessary to pattern the cladding 41 so that one end of the core 40 would be exposed in the case of manufacturing the light flux transmission element 22 in accordance with the fifth embodiment, differently from the case of the first embodiment. Accordingly, there are advantages that manufacture is easy and efficient manufacture can be achieved with a shorter time.

A technical field of the invention is not limited to the embodiments. The invention can be variously modified within a range not deviated from the spirit of the invention.

In the respective embodiments, for example, exemplified has been the air-floating type information recording and reproducing device 1 in which a near field optical head is made float. The invention is not limited to the above. The disc D can be in contact with the slider 20 so long as the slider 20 is provided so as to face the disc surface D1. That is to say, the near field optical head in accordance with the invention may be a contact slider type head. Similar operations and effects can be also achieved even in this case.

Figure 18:
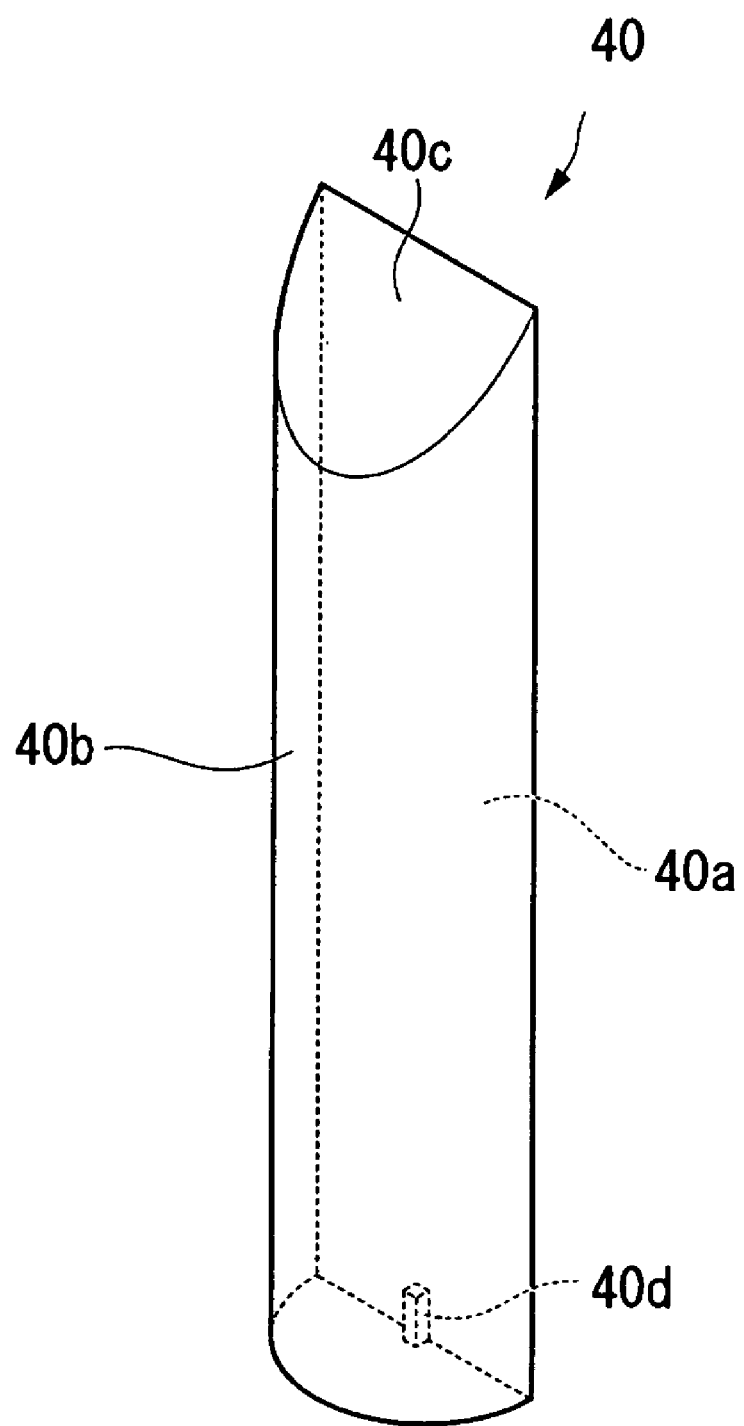
[FIG. 18] It is a perspective view of a core of a light flux transmission element in accordance with a modification of the invention.
Figure 19:
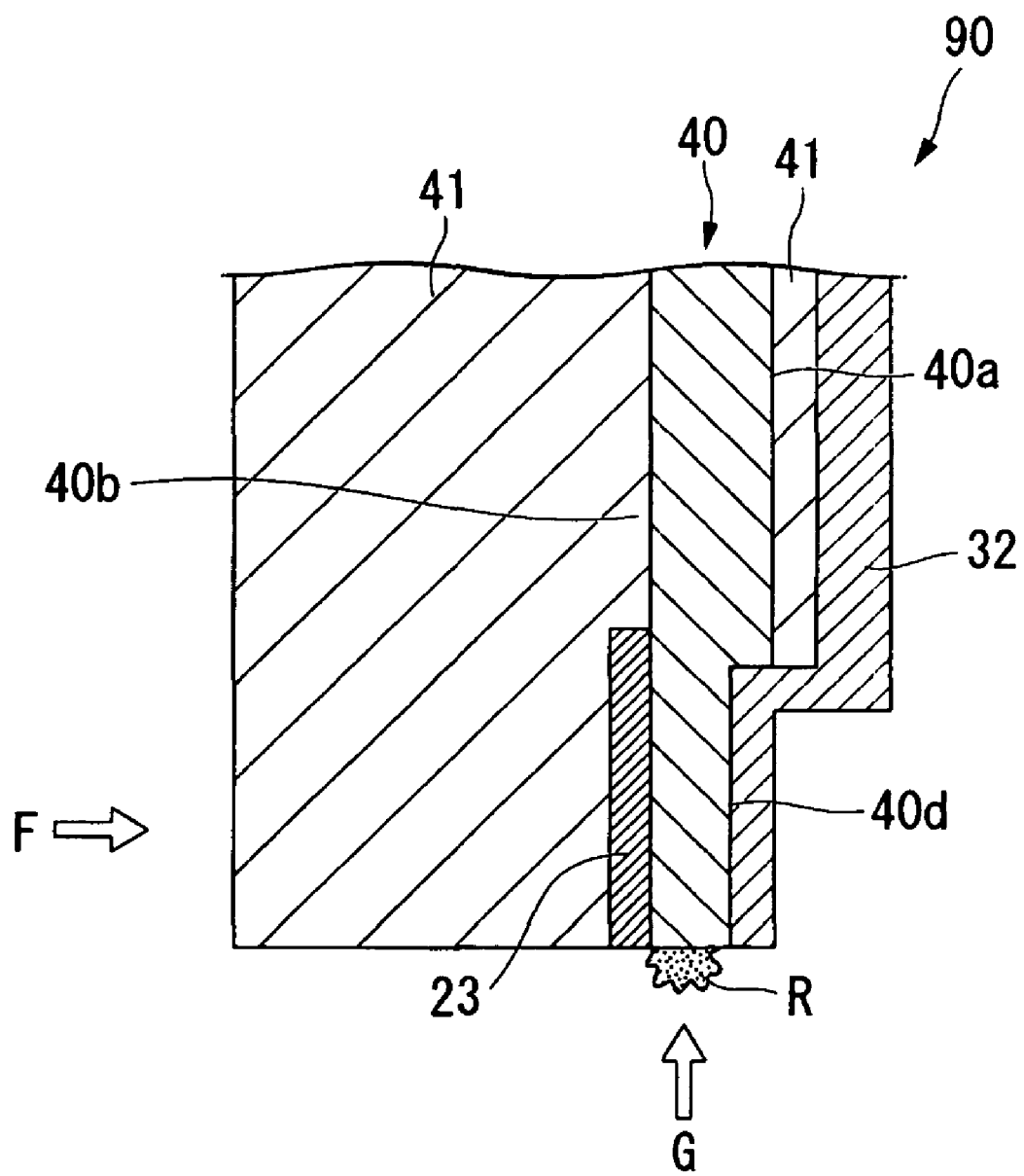
[FIG. 19] It is a partially enlarged sectional view of a light flux transmission element having the core shown in FIG. 18.
Figure 20:
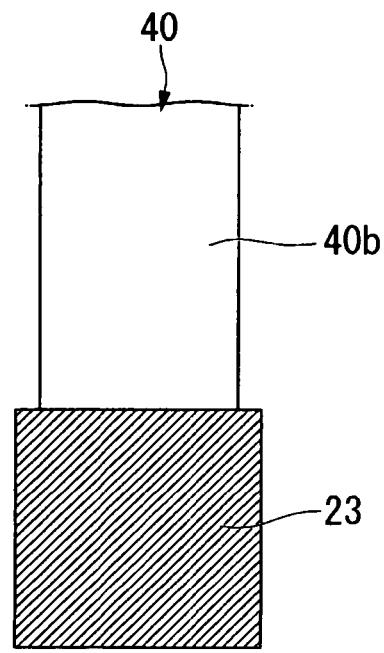
[FIG. 20] It illustrates the core and the metal film, which are shown in FIG. 19, in a view from an arrow F.
Figure 21:
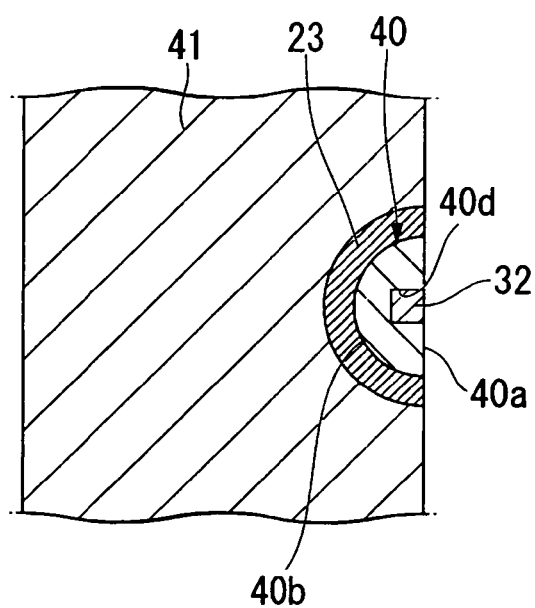
[FIG. 21] It illustrates the light flux transmission element shown in FIG. 19 in a view from an arrow G.

Further, in the respective embodiments, exemplified has been a case that the core 40 of the light flux transmission element 22 is formed so as to be tapered from one end to the other end. The invention, however, is not limited to the above. The core 40 may be constant in width and height from one end to the other end, as shown in FIG. 18, for example. The light flux L having been transmitted in the core 40 is also incident on the metal film 23 in the vicinity of the other end, as shown in FIGS. 19 to 21, even in the case of a light flux transmission element 90 having the core 40 formed as described above. Accordingly, it is possible to excite the surface plasmon to generate the near field light R, similarly to the respective embodiments. This allows similar operations and effects to be achieved.

FIG. 20 illustrates the core 40 and the metal film 23, which are shown in FIG. 19, in a view from an arrow F. FIG. 21 illustrates the light flux transmission element 90 shown in FIG. 19 in a view from an arrow G.

Forming the core 40 so as to be tapered, however, allows a spot size of the light flux L incident on the metal film 23 to be made small, so that the surface plasmon can be more efficiently excited, and thereby, the near field light R is efficiently generated. This is more preferable.

The invention claimed is:

1. A near field optical head for generating near field light from an introduced light flux to heat a magnetic recording medium rotating in a fixed direction and for causing magnetization reversal by giving a recording magnetic field perpendicular to the magnetic recording medium to record information, the near field optical head characterized by comprising:
   a slider provided so as to face a surface of the magnetic recording medium;
   a recording element having a main magnetic pole for generating the recording magnetic field and an auxiliary magnetic pole and fixed to a top end surface of a slider so that the both magnetic poles would be in line in a longitudinal direction of the slider with the auxiliary magnetic pole being located on a top end surface side of the slider;
   a light flux transmission element having a core formed from a flat surface and a curved surface into the shape of a half column for reflecting the light flux introduced from one end side in the core to transmit the light flux to the other end side and a cladding closely adhered to the core for confining therein the core with the other end side of the core being exposed at least to the outside, the light flux transmission element being fixed adjacently to the main magnetic pole so that the other end side would be faced to the magnetic recording medium while the flat surface would be faced to the main magnetic pole;
   a metal film formed at least on the curved surface in the vicinity of the other end side for generating near field light from the light flux having been transmitted in the core and localizing the generated near field light on a field surface between the metal film and the curved surface; and
   a light flux introducing means fixed to the slider so as to be provided parallel to the slider for introducing the light flux having a polarizing direction adjusted into a straight direction substantially perpendicular to the flat surface from the one end side into the core,
   wherein the main magnetic pole has a top end bending toward a core side and is exposed to the other end side while being embedded in the core.

2. The near field optical head according to claim 1, characterized in that
   the core is formed so as to be tapered from one end to the other end.

3. The near field optical head according to claim 1, characterized in that
   at least a part of a top end of the main magnetic pole embedded in the core is made a curved surface swelling out toward the metal film and the part is close to the metal film.

4. The near field optical head according to claim 2, characterized in that
   at least a part of a top end of the main magnetic pole embedded in the core is made a curved surface swelling out toward the metal film and the part is close to the metal film.

5. The near field optical head according to claim 1, characterized in that
   the cladding is formed with one end of the core being exposed to an outside.

6. The near field optical head according to claim 1, characterized by comprising
   a reproducing element for outputting an electric signal corresponding to a size of a magnetic field leaked from the magnetic recording medium.

7. The near field optical head according to claim 6, characterized in that
   the reproducing element is provided between the slider and the recording element.

8. The near field optical head according to claim 6, characterized in that
   the reproducing element is provided so as to be embedded in the cladding.

* * * * *